(12) United States Patent
Ruiz et al.

(10) Patent No.: US 8,178,032 B2
(45) Date of Patent: May 15, 2012

(54) MANUFACTURE OF COMPOSITES BY A FLEXIBLE INJECTION PROCESS USING A DOUBLE OR MULTIPLE CAVITY MOLD

(75) Inventors: Eduardo Ruiz, Verdun (CA); Francios Trochu, Montreal (CA)

(73) Assignee: Polyvalor, Limited Partnership, Montreal, Quebec (CA)

( * ) Notice: Subject to any disclaimer, the term of this patent is extended or adjusted under 35 U.S.C. 154(b) by 0 days.

(21) Appl. No.: 12/958,594

(22) Filed: Dec. 2, 2010

(65) Prior Publication Data

US 2011/0068514 A1    Mar. 24, 2011

Related U.S. Application Data

(62) Division of application No. 10/561,934, filed as application No. PCT/CA2004/000959 on Jun. 25, 2004, now Pat. No. 7,866,969.

(30) Foreign Application Priority Data

Jun. 27, 2003 (CA) .................................. 2434447

(51) Int. Cl.
*B29C 35/08* (2006.01)
(52) U.S. Cl. .......... 264/496; 264/69; 264/101; 264/102; 264/454; 264/459; 264/544; 264/546; 264/551; 264/552; 264/554; 264/570; 264/571
(58) Field of Classification Search .................... 264/69, 264/101, 102, 454, 459, 496, 544, 546, 551, 264/552, 554, 570, 571; 425/112, 129.1, 425/389, 405.1

See application file for complete search history.

(56) References Cited

U.S. PATENT DOCUMENTS

| 4,942,013 A | 7/1990 | Palmer et al. |
|---|---|---|
| 5,087,193 A | 2/1992 | Herbert, Jr. |
| 5,093,067 A | 3/1992 | Gibson |
| 5,152,949 A | 10/1992 | Leoni et al. |
| 5,439,635 A | 8/1995 | Seemann |

(Continued)

FOREIGN PATENT DOCUMENTS

DE           19926896          12/2000

(Continued)

OTHER PUBLICATIONS

Koschmieder, J., et al., Innovation in the Production of Continuous Fibre Reinforced Plastic Parts, Macromol. Mater. Eng. 2000, 284/285, 52-63.

*Primary Examiner* — Joseph Del Sole
*Assistant Examiner* — Timothy Kennedy
(74) *Attorney, Agent, or Firm* — Banner & Witcoff, Ltd.

(57) ABSTRACT

The present invention generally relates to a mold assembly (32, 34) and a method of using the mold for the manufacture of composite parts which, more particularly, are generated from a strengthener in a generally solid phase and a matrix in a generally liquid phase. Various types of molds and processes may be used in order to impregnate a strengthener with a matrix such that a composite part may be manufactured, but the efficiency rate and the duration of the manufacturing process significantly varies depending on the chosen type of mold and process. The present invention relates to a mold assembly and to the manufacture of composites by using the mold assembly which includes the injection of the matrix in the mold assembly containing the strengthener and a deformable member (36) which favors the impregnation of the matrix toward the strengthener.

23 Claims, 34 Drawing Sheets

U.S. PATENT DOCUMENTS

| | | |
|---|---|---|
| 5,441,692 A | 8/1995 | Taricco |
| 5,464,337 A | 11/1995 | Bernardon et al. |
| 5,672,227 A | 9/1997 | Chiu |
| 5,885,513 A | 3/1999 | Louderback et al. |
| 6,033,203 A | 3/2000 | Christensen et al. |
| 6,136,236 A | 10/2000 | Boccard et al. |
| 6,159,414 A | 12/2000 | Tunis et al. |
| 6,250,909 B1 | 6/2001 | Segen, Jr. |
| 6,257,866 B1 | 7/2001 | Fritz et al. |
| 6,506,325 B1 | 1/2003 | Cartwright |
| 2002/0022422 A1 | 2/2002 | Waldrop, III et al. |
| 2002/0146529 A1 | 10/2002 | Lang et al. |
| 2004/0113315 A1 | 6/2004 | Graham |

FOREIGN PATENT DOCUMENTS

| | | |
|---|---|---|
| FR | 2673571 | 9/1992 |
| FR | 2763879 | 12/1998 |
| FR | 2828130 | 2/2003 |
| JP | 10154334 | 6/1998 |
| WO | 96/22871 | 8/1996 |
| WO | 00/41867 | 7/2000 |
| WO | 00/53400 | 9/2000 |
| WO | 01/02146 | 1/2001 |
| WO | 02/02299 | 1/2002 |
| WO | 02/058916 | 8/2002 |

MANUFACTURE OF COMPOSITES BY A FLEXIBLE INJECTION PROCESS USING A DOUBLE OR MULTIPLE CAVITY MOLD

RELATED APPLICATIONS

This application is a divisional of co-pending U.S. Ser. No. 10/561,934, filed Apr. 17, 2006, which is entirely incorporated herein by reference.

FIELD OF THE INVENTION

The present invention generally relates to the manufacture of composite parts. More specifically, the present invention is concerned with the manufacture of a composite part by injection of a liquid phase throughout a porous solid phase.

BACKGROUND OF THE INVENTION

Composite materials are generally considered engineering materials made from two or more components. One component is often a fiber or porous solid phase, generally called the strengthener, which gives the material its tensile strength, while another component is often a resin or liquid phase, generally called the matrix, which binds the strengthener together and renders the composite material generally either stiff and rigid or deformable as a whole.

Several processes used in the manufacture of composite parts consist of impregnating the strengthener with the matrix, which may be a polymer (a resin) or any material that is liquid at the injection temperature. Variants of this family of processes are now grouped, under the generic term LCM or Liquid Composite Molding. Although they are used principally for the manufacture of polymer matrix composite parts, LCM processes are also encountered in biomedical and electronics applications, for example when injecting a polymer to insulate microelectronic circuits. A molten metal may be injected instead of a polymer resin in order to manufacture metal matrix composite parts.

Polymer matrix composite manufacturing processes may be separated into several categories:

Contact Molding Process

This manual method generally uses a half-mold on which the dry strengthener is set in layers that are impregnated by hand.

Autoclave Process

The composite part is generally manufactured by hand from pre-impregnated strengtheners and then cured in an autoclave. This method is widely used in aeronautics, most notably in the military sector. However, its cost remains generally high.

RTM (Resin Transfer Molding) Process

The matrix in its liquid state is generally injected throughout a strengthener confined in a rigid mold. Liquid injection in the RTM process may be carried out at ambient temperature or at a higher temperature by heating either the injected liquid, the mold or both.

VARTM (Vacuum Assisted Resin Transfer Molding) Process

A vacuum is generated inside the mold in order to facilitate and accelerate matrix injection.

CRTM (Compression Resin Transfer Molding) Process

Also called injection-compression, the CRTM process generally consists of opening slightly the gap between the mold halves during injection to accelerate the liquid flow, after which the part is consolidated and sized to specification by lowering the press on the molds or one of the mold halves on the other.

VARI (Vacuum Assisted Resin Infusion) Processes

The strengthener is generally arranged beneath a plastic film or elastic membrane, creating a compartment which may be placed under vacuum. The liquid then infuses into the strengthener by gravity.

RTM Light Process

This variant combines the advantages of deforming one boundary of the mold, as in the VARI process, with an imposed injection pressure, as in the RTM process. The mold consists of one or two thin metal or composite shells, which may be deformed under the pressure of injection. A first vacuum usually ensures closure of the mold, while a second vacuum is generated inside the cavity to accelerate injection.

Other Variants

Numerous other variants of the LCM processes exist, which may be associated with one or another of the previously described main categories. For example, the VEC injection process uses reservoirs containing a non-compressible fluid to strengthen the walls of a mold that are not in contact with the part. Preferential flow channels may also be created by various means in an outer layer of the strengthener (SCRIMP process), in one of the mold walls or inside the cavity, in order to facilitate liquid infusion or injection.

The quality of parts manufactured by contact molding is generally lower on average than that of injected parts. Labor costs are considerable as well, since each layer of the strengthener must be precisely positioned in the cavity and the laminate impregnated by hand. During impregnation by the liquid, air bubbles are often entrapped inside the composite part. This constitutes the principal problem with contact molding and explains notably the large variations observed in part weight. A second disadvantage stems from the difficulty of ensuring constant part thickness and uniform fiber content, two critical parameters that govern the quality and mechanical properties of the composite part. Finally, another problem arises from increasingly strict government regulations concerning toxic gases or vapors generated during open mold manufacturing.

LCM processes based on the use of closed molds significantly eliminate most gaseous emissions during manufacturing. Conventional liquid injection molding is done using two rigid half-molds: the base generally designates the bottom portion of the mold, which remains immobile and the punch designates the top portion, which is raised in order to open the mold and free the part at the end of the manufacturing cycle. Between these two half-molds lies a cavity in which the strengthener is arranged and into which the injection occurs.

The RTM process and its variants VARTM and CRTM are generally appropriate for the manufacture of structural composite parts, but constant thickness remains difficult to achieve because of the non uniform shrinkage of the resin during the cure. It is not always easy to eliminate porosity completely in injected parts, even by creating vacuum in the cavity before injection. Finally, the biggest difficulty is associated with the injection time, which is generally too long for strengtheners with high fiber content (i.e., more than 50%).

Overall, average surface appearance, low geometrical precision of the parts and limits regarding fiber content and injection time all reduce the range of applications of RTM process and its derived processes such as heated RTM, VARTM and injection-compression (CRTM). One constraint peculiar to CRTM process should also be mentioned. In general, the punch closes along a vertical axis, which results in practically no compression of the strengthener in the vertical zones of the cavity, while maximal pressure is exerted in the horizontal zones. This problem, in addition to difficulties inherent to the complexity of the process and risks of air entrapment during the compression phase, significantly limit the applications of CRTM process. It should be noted that compression of one half-mold over the other may also be performed by zones, but this significantly complicates the manufacturing of the mold.

Recently, new vacuum impregnation processes (VARI) have been introduced, which present the advantage of not requiring a cover mold. In these so-called liquid aspiration infusion processes, the strengthener is still arranged in the mold cavities, but is then covered with an impermeable membrane sealed to the outer edges of the mold. The air inside the cavity formed between the membrane and the mold may then be evacuated using a vacuum pump. Atmospheric pressure then compacts the strengthener, while the liquid flows from an external source into the strengthener-filled cavity under vacuum. In this type of VARI process, liquid infusion into the strengthener is carried out under vacuum at low flow rate under the single effect of static pressure due to gravity. The inclusion of air bubbles is thus eliminated, solving one of the problems encountered in other injection variants. However, the effect of gravity generally introduces non uniformity into the impregnation of the strengthener for large parts. In spite of the apparent simplicity of VARI processes, problems persist because the flow of the viscous matrix, such as for example resin, is difficult through strengtheners of low permeability. The fiber contents and dimensional accuracy of parts infused by VARI process are generally lower than the levels that may be accommodated by RTM process. Since resistance to resin penetration increases with the distance to be crossed, portions of certain parts may remain dry while excesses of resin accumulate in other zones.

In order to resolve these problems, variants of these processes have been recently developed, which artificially increase local permeabilities in the strengthener and thus decrease filling time. These include resin-dispersing permeable felts on one surface of the strengthener, networks of tubes to distribute the liquid matrix flow throughout the cavity, preferential flow channels or grooves incorporated into the surface of the mold and so on. All of these methods pose particular problems. The use of felt leads to increased waste of material, which is incompatible with mass production. Networks of tubes and flow channels generate practical development difficulties, which can be overcome only at the expense of generally costly trial periods. Finally, infusion still remains excessively slow compared to injection. The pressure gradient driving liquid penetration is much greater in an injection process than the infusion gradient which cannot exceed ambient atmospheric pressure minus the residual pressure inside the cavity under vacuum.

OBJECTS OF THE INVENTION

An object of the present invention is therefore to provide a mold and a method of using the mold which allows to rapidly and efficiently inject under pressure the liquid matrix required to manufacture the composite part, without having to wait for complete impregnation of the strengthener.

A further object of the present invention is therefore to provide a mold and a method of using the mold which allows controlling the progression of the matrix flow front through the strengthener to increase the composition, geometrical and mechanical quality of the composite part during the various manufacturing steps.

Another further object of the present invention is to provide a mold and a method of using the mold which allows producing one or more than one composite part at the same time and with generally the same mold injection equipment.

SUMMARY OF THE INVENTION

More specifically, in accordance with the present invention, there is provided a mold assembly for generating a composite part from a strengthener in a generally solid phase and a matrix in a generally liquid phase; the mold assembly including a base mold including a strengthener chamber for receiving the strengthener and a matrix injection inlet for injecting the matrix in the strengthener chamber; the mold assembly further including a cover mold including a compression chamber and a fluid control aperture for injecting a fluid in the compression chamber; the cover mold being so configured as to be sealingly mounted on the base mold whereby the strengthener chamber and the compression chamber are adjacent; and the mold assembly further including a deformable member so provided in a gap defined by the strengthener chamber and the compression chamber as to pressurize the matrix toward the strengthener upon compression by the fluid.

There is furthermore provided a mold assembly for generating a predetermined number of composite parts from strengtheners in a generally solid phase and from matrix in a generally liquid phase; the mold assembly including a base mold including a strengthener chamber and a cover mold including a compression chamber; the mold assembly further including at least one frame assembly, each including a separator defining a further respective strengthener chamber and a further respective compression chamber; the at least one frame assembly being so configured as to be sealingly stacked one next to the other and between the base mold and the cover mold, whereby each of the strengthener chamber faces one of the compression chamber to define adjacent pairs of chambers; the mold assembly further including matrix injection inlets for injecting the matrix in the strengthener chambers; the mold assembly further including fluid control apertures for injecting a fluid in the compression chambers; and the mold assembly further including deformable members so provided between the adjacent pairs of chambers as to pressurize the matrix toward the strengthener upon compression by the fluid.

There is furthermore provided a mold assembly for generating a predetermined number of composite parts from strengtheners and matrix; the mold assembly including a base mold including a contact wall; the mold assembly further including at least one frame assembly so configured as to be sealingly stacked one next to the other on the base mold defining a stacking chamber thereby; the mold assembly further including matrix injection inlets for injecting the matrix in the strengtheners trough the base mold and the at least one frame assembly; the mold assembly further including deformable elements, each having a respective compression wall and a further respective contact wall, the deformable elements being so configured as to be alternatively stacked with the strengtheners in the stacking chamber whereby each of the contact wall faces one of the compression wall; and the mold assembly further including a cover mold including a further respective compression wall and being mounted in the stacking chamber.

There is furthermore provided a mold assembly for generating a composite part from a strengthener and a matrix; the mold assembly including a base mold including a strengthener chamber for receiving the strengthener and a matrix injection inlet for injecting the matrix in the strengthener chamber; the mold assembly further including a cover mold including a compression chamber and a fluid control aperture for injecting a fluid in the compression chamber; the cover mold being so configured as to be sealingly mounted on the base mold whereby the strengthener chamber and the compression chamber are adjacent; and the mold assembly further including a deformable membrane provided in a gap defined by the strengthener chamber and the compression chamber; whereby upon operation, the matrix is injected via the injection inlet in the strengthener located in the strengthener chamber, a first portion of the matrix impregnates the strengthener and a second portion of the matrix remains in the strengthener chamber and deforms the deformable membrane thereby, the second portion being forced into the strengthener by the fluid pressurizing the deformable membrane when injected in the compression chamber via the control aperture.

There is furthermore provided a method for generating a composite part from a strengthener and a matrix including sealingly positioning a deformable member in between a first chamber of a first mold portion and a second chamber of a second mold portion, the first chamber receiving the strengthener; impregnating the strengthener with the matrix injected in the first chamber; compacting the matrix toward the strengthener by pressurizing a controlling fluid injected in the second chamber on the deformable member.

There is furthermore provided a method for generating a pre-determined number of composite parts from strengtheners and matrix including sealingly positioning a deformable member in between a strengthener chamber of a first mold portion and a compression chamber of a second mold portion, the strengthener chamber including the strengthener; repeating the sealingly positioning a deformable member by stacking a number of subsequent mold portions one next to the other determined by a predetermined number of parts to manufacture; impregnating the strengtheners with matrix injected in the strengthener chambers; compacting the matrix toward the strengthener by pressurizing a controlling fluid injected in the compression chamber on the deformable member.

There is furthermore provided a method for generating a predetermined number of composite parts from strengtheners and matrix including positioning an alternating stack of strengtheners and deformable members in a stacking chamber generated by sealingly mounting frame assemblies on a base mold assembly; impregnating the strengtheners with matrix injected in the stacking chamber; compacting the matrix toward and along the strengtheners by pressurizing on the stack of strengtheners and deformable members.

Other objects, advantages and features of the present invention will become more apparent upon reading of the following non-restrictive description of preferred embodiments thereof, given by way of example only with reference to the accompanying drawings.

DETAILED DESCRIPTION

Generally stated, the present invention relates to the manufacture of a composite material by injecting in a mold assembly a generally liquid phase, called the matrix, throughout a strengthener that is in a generally solid phase with a method of injection that favors an efficient impregnation of the matrix in the strengthener. The matrix is generally a resin, such as for example a thermoset or a thermoplastic polymer or a liquid metal, and the strengthener is a fibrous, granular or any other type of porous material. Examples of commonly used thermoset polymers include epoxy, polyester, vinylester or phenolic resins, and examples of commonly used liquid metals include aluminum or magnesium. The process of injection of the matrix into the strengthener is often used for the manufacture of composite parts. For example, a polymer, a metallic or a ceramic matrix may be reinforced by glass, carbon, kevlar, metal, ceramic or other strengtheners. In the case of fibrous strengtheners, cloths or mats made of glass fiber, carbon, kevlar, aramide, natural fibers are generally used. The range of applications for such composite parts manufactured by such a process covers, amongst others, the field of transport vehicles (marine, automotive, aeronautical) and may also be used in the sport, biomedical and electronics sectors.

Figure 1:
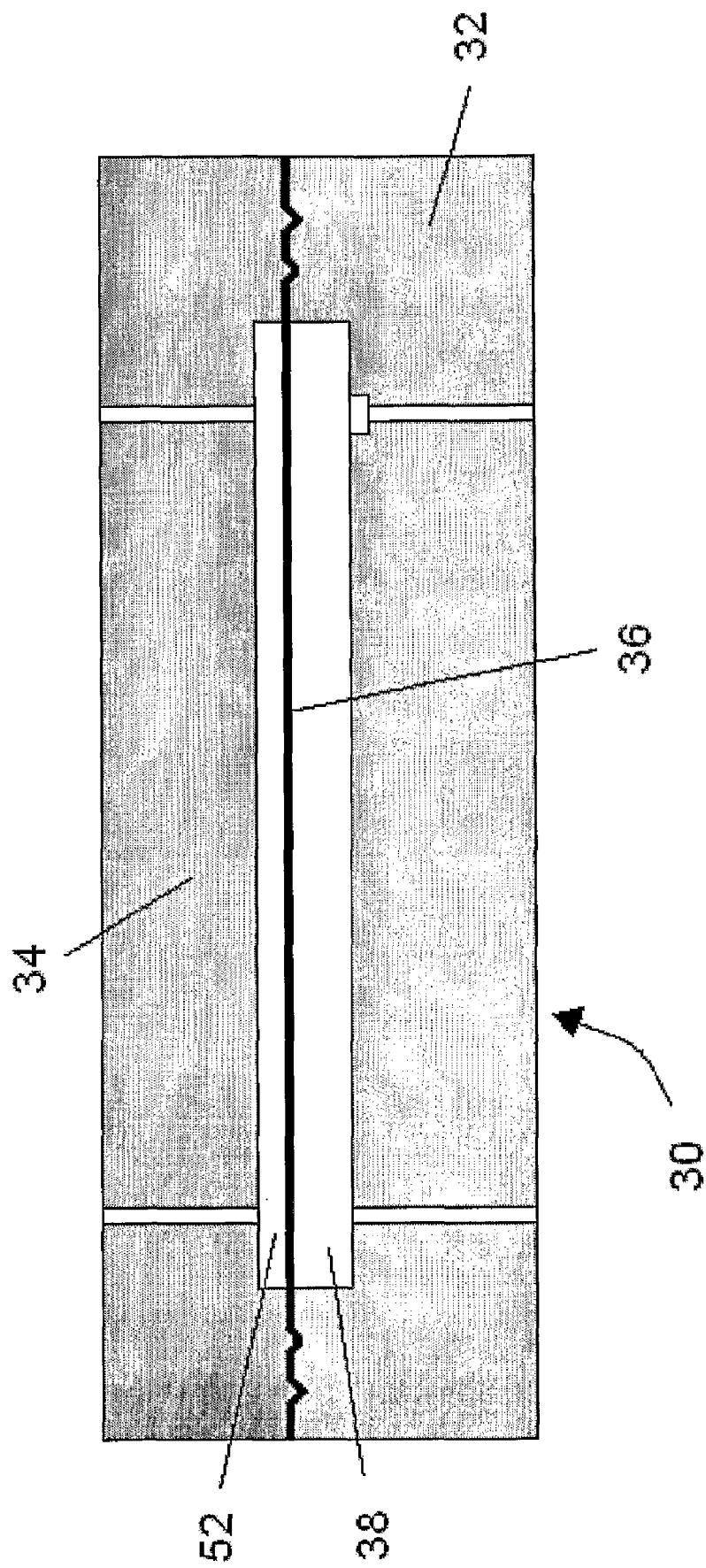
FIG. 1 is a side section view of a mold according to a first embodiment of the present invention.

The illustrative embodiment of FIG. 1 shows a mold assembly 30 used in the injection of a matrix into the strengthener for the manufacture of composite parts. The mold assembly 30 is generally rigid and includes a base mold 32, a cover mold 34 and a deformable member, show in the illustrative embodiment as a membrane 36.

Figure 2:
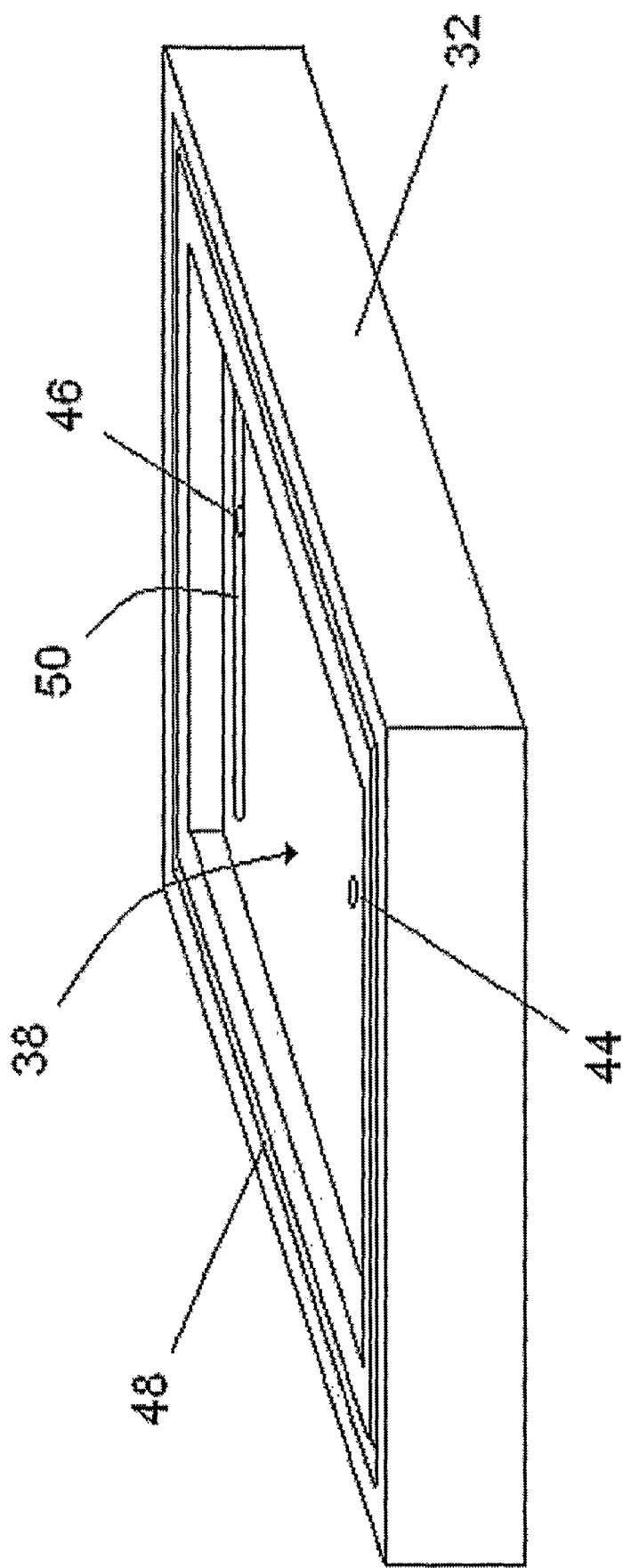
FIG. 2 is a perspective view of the base mold shown in FIG. 1.
Figure 3:
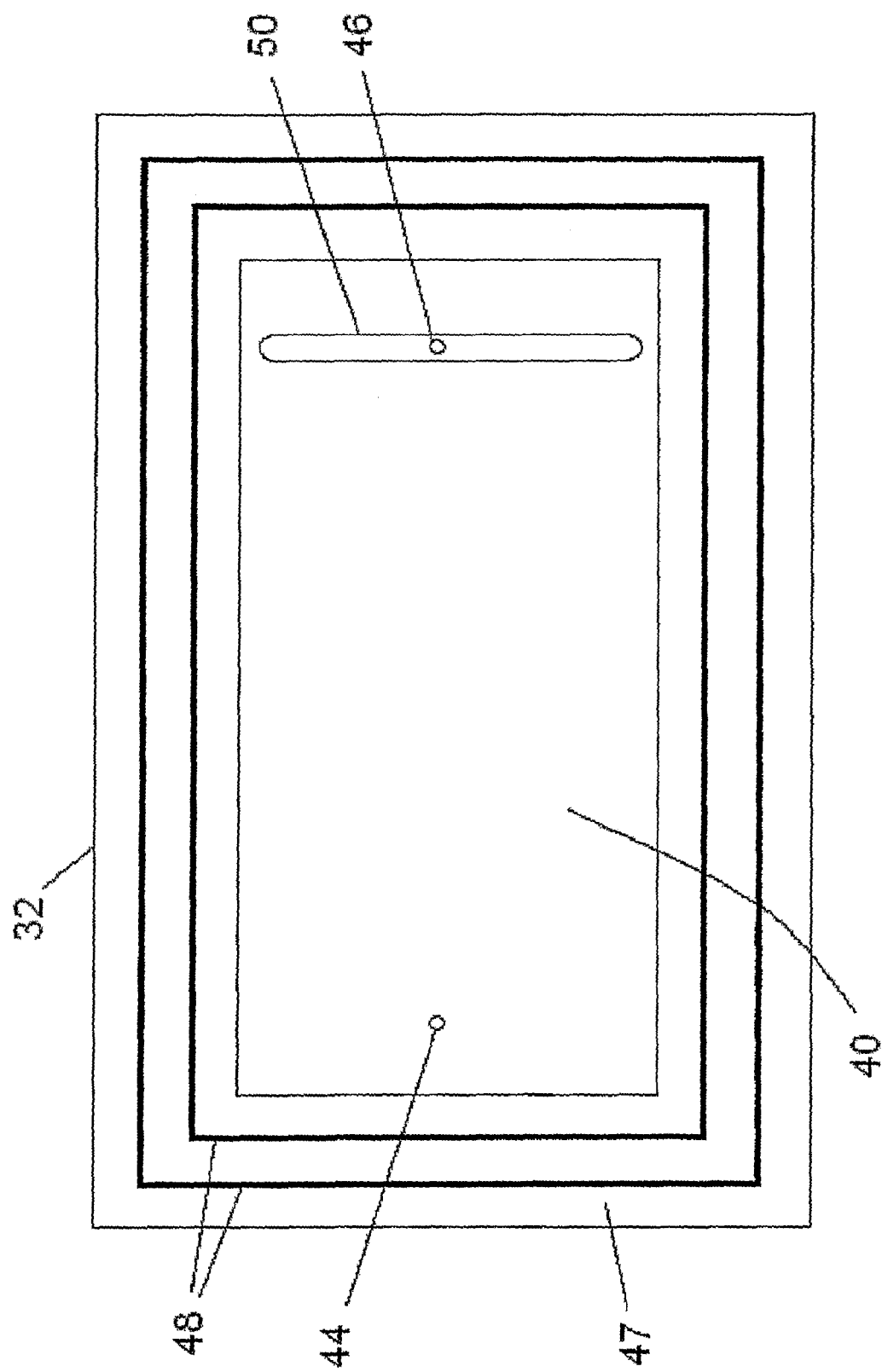
FIG. 3 is a top view of the base mold shown in FIG. 2.
Figure 4:
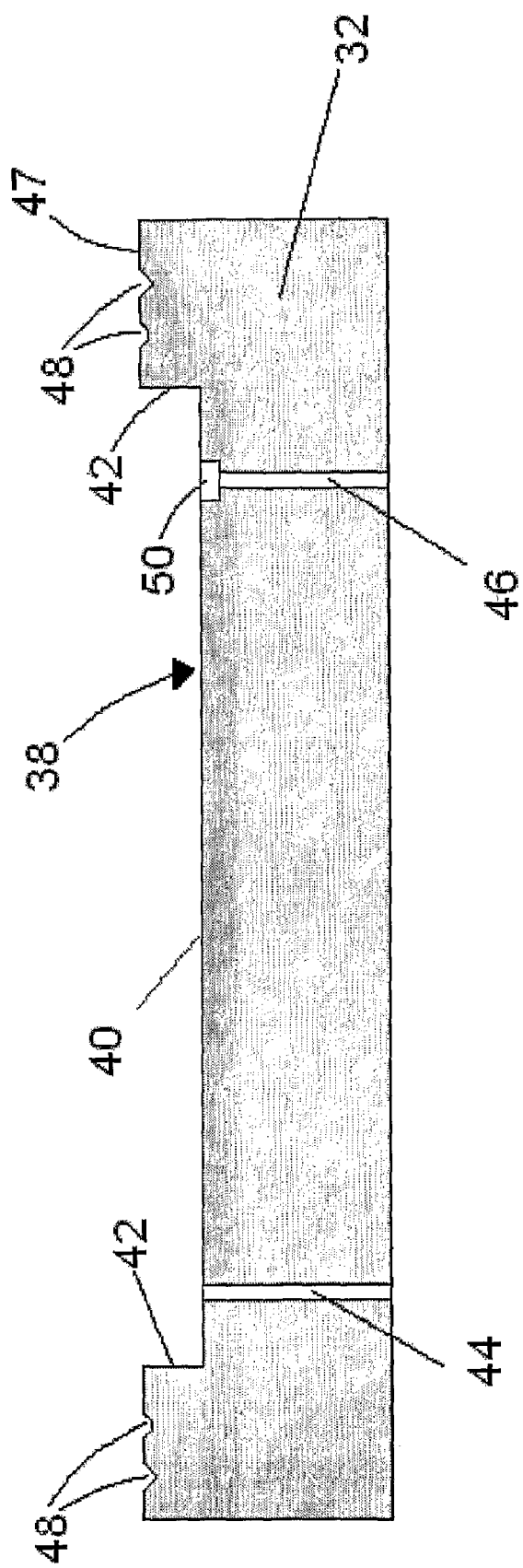
FIG. 4 is a side section view of the base mold shown in FIG. 2.

The base mold 32 is illustrated in more details in FIGS. 2, 3 and 4 and includes a strengthener chamber 38 which is defined by a contact wall 40 and by peripheral walls 42. When in use, the strengthener chamber 38 is generally so configured as to receive a strengthener and to provide the space into which the matrix is injected to manufacture the composite part.

The base mold 32 and its strengthener chamber 38 are generally designed to the dimensions of the strengthener to be injected with the matrix. It is easily understandable to the skilled reader that in the Figures, the base mold 32 is presented with a configuration adapted to receive a flat rectangular strengthener plate, but can be configured to suit various shapes of strengthener or a combined strengthener with a foamed core.

The base mold 32 further includes an evacuation outlet 44 and an injection inlet 46. The evacuation outlet 44 extends from the strengthener chamber 38 to the external surface of the base mold 32, and is so configured as to be connected to a vacuum source (not shown) to generate suction or vacuum in the strengthener chamber 38. More than one evacuation outlet 44 may be included in the base mold 32 and each of them may be connected to more than one vacuum source (not shown).

The injection inlet 46 extends through the base mold 32 with a first end being so configured as to be mounted to a matrix source (not shown) and with a second end in communication with the strengthener chamber 38. In the illustrative embodiment, the second end includes a diffusion passage 50 extending along any desired path in the strengthener chamber 38 to maximize the diffusion of the matrix therein. Of course, more than one injection inlets 46 may be provided around the strengthener chamber 38 or at its periphery.

The shoulder 47 of the base mold 32 includes grooves 48 which are represented, as an example, as having a generally triangular cross-section which helps to hold the membrane 36 and to sealingly mount the cover mold 34 to the base mold 32. Optionally, additional standard molding elements, such as for examples o-ring sealants, tubes, guides, or demolding devices (not shown) may be added to facilitate mold closure and mold opening.

Figure 5:
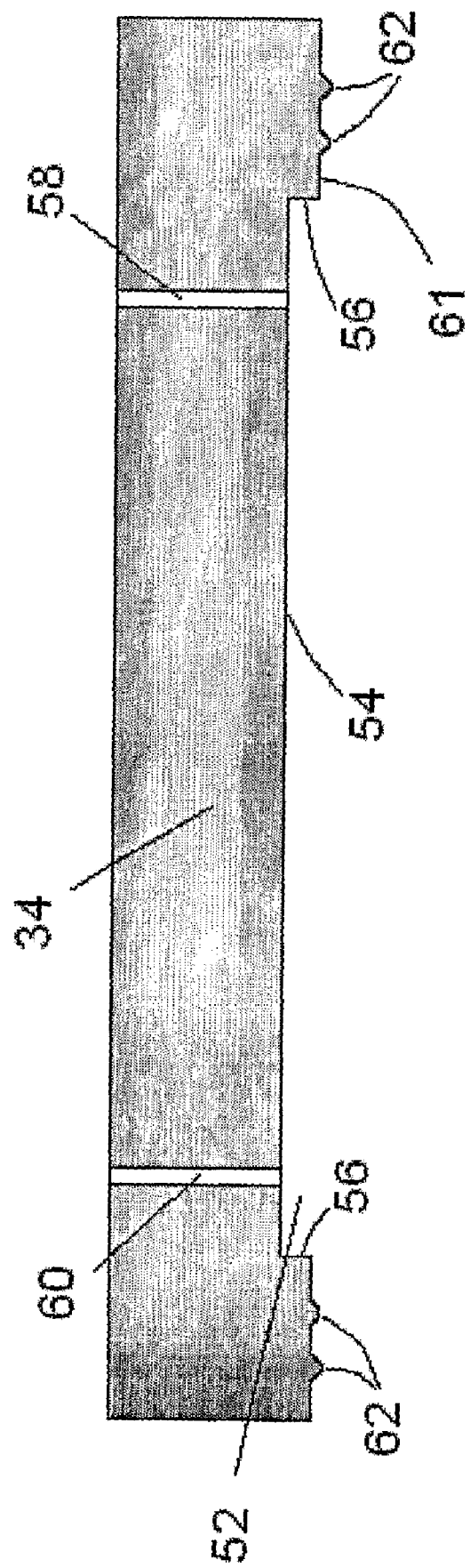
FIG. 5 is a side section view of the cover mold shown in FIG. 1.
Figure 6:
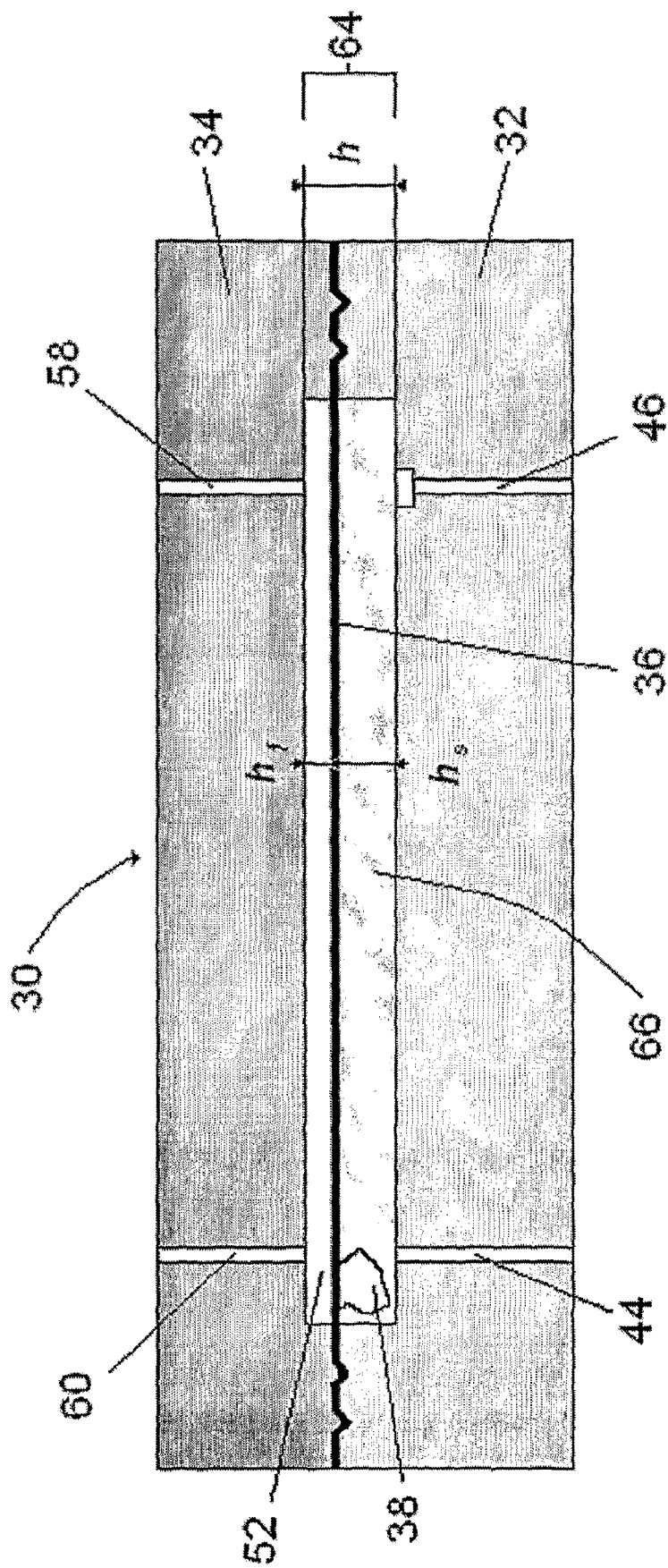
FIG. 6 is a side section view of the mold of FIG. 1 provided with a strengthener.

Turning now to FIGS. 5 and 6, the cover mold 34 includes a compression chamber 52 which is defined by a compression wall 54 and by peripheral walls 56. When in use, the compression chamber 52 is so configured as to receive a fluid or pressure means and has a geometry which is generally determined by the configuration of the part to be molded, as will be further described hereinbelow.

The cover mold 34 further includes a fluid control aperture 58 and a vent 60. The fluid control aperture 58 extends from the external surface of the cover mold 34 to the compression chamber 52, and is so configured as to be connected to a pressurized fluid source (not shown) to provide pressure in the compression chamber 52. More than one fluid control aperture 58 may be included in the cover mold 34 and each of them may be connected to more than one pressurized fluid source (not shown).

In the embodiment shown in FIG. 6, a single fluid control aperture 58 is extending in the cover mold 34 in a direction which is generally along the direction of the injection inlet 46 in the base mold 32.

The vent 60 also extends from the compression chamber 38 to the external surface of the cover mold 34, and is so configured as to expel the fluid contained in the compression chamber 52. Alternatively, the vent 60 is connected to a vacuum source (not shown) to selectively provide suction or a partial vacuum in the compression chamber 52, or includes valves (not shown) to regulate the flow of fluid in the compression chamber 52. More than one vent 60 may be included in the cover mold 34.

The shoulder 61 of the cover mold 34 includes ridges 62 which are so configured as to cooperate with the grooves 48 of the base mold 32 and are represented, as an example, as having a generally triangular cross-section. The assembly of the ridges 62 and grooves 48 generally extends around the shoulders 47, 61, in the periphery of the molds 32, 34 to help hold or locate the membrane 36, to mount the base mold 32 and the cover mold 34 together and to seal the chambers 38, 52.

In FIG. 6, the mold assembly 30 contains the strengthener 66 in the chamber 38 of the base mold 32. When mounted together, the cover mold 34 and the base mold 32 delimit a gap 64 which includes the two chambers 38, 52 separated by the membrane 36.

The gap 64 is shown in FIG. 6 as having a total thickness or height h, including the compression chamber 52 having a thickness or height h.sub.f and the strengthener chamber 38 having a thickness or height h.sub.s. The height h is adjusted as a function of the thickness of the strengthener being injected with the matrix, in order to control the filling of the strengthener by the matrix, as will be further explained hereinbelow. Also the variations of the height h allow the manufacture of composite parts of variable thickness.

The membrane 36 is provided in a cavity or gap defined by the strengthener chamber 38 and the compression chamber 52. The membrane 36 is generally a thin impermeable layer such as a plastic film, an elastic membrane, or a generally deformable foam not necessarily having a uniform thickness, or any type of material impermeable to the matrix used. Alternatively, the membrane 36 may be permeable to gas only.

The membrane 36 is sufficiently flexible to be deformed under pressure induced in the chambers 38, 52, such that the height h.sub.f and the height h.sub.s are variable. As will be described hereinafter, this has the effect of facilitating the impregnation of the matrix in the strengthener. The deformation of the membrane 36 is nevertheless limited by the thickness h of the gap 64 which, as mentioned hereinabove, is not necessarily uniform.

The surface finish of the contact wall 40 depends on the desired surface appearance for the composite part to manufacture. Usually, the base mold 32 is made of metal, but it can also be made of any material normally used to manufacture injection molds, for example, an epoxy/aluminum foam or a multi-layer composite mold. The surface finish of the compression wall 54 does not generally need to be of the same quality as that of the contact wall 40 of the base mold 32 since most of the times, the compression wall 54 is not directly touching the strengthener, but usually indirectly in communication with the strengthener via the membrane 36.

In operation, the mold assembly 30 is used to manufacture a composite part by injecting the matrix throughout the strengthener 66. For clarity purposes, the manufacturing process will now be described with reference to a composite plate formed with the following steps: laying of the strengthener; placement of the membrane; closure of the mold assembly; application of vacuum to the strengthener chamber; injection of the matrix; injection of the controlling fluid; compaction of the composite part; solidification of the part; and ejection from the mold assembly.

Laying of the Strengthener

Figure 7:
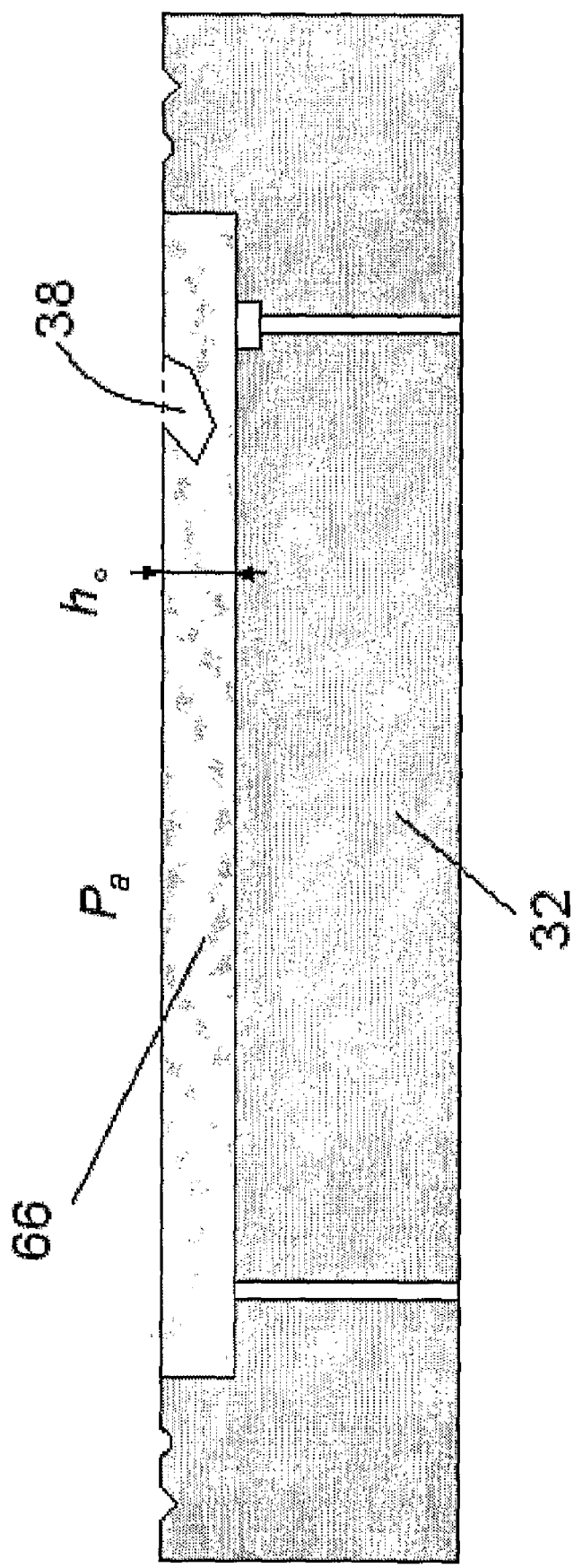
FIG. 7 is a side section view of the base mold showing a first step in a process for manufacturing a composite part.

As illustrated in FIG. 7, the strengthener 66 is first positioned in the chamber 38 of the base mold 32. This strengthener 66 is generally the "skeleton" of the composite material, as opposed to the matrix provided by injection to impregnate and fill the strengthener 66. Under atmospheric pressure Pa, the free thickness of the generally non-compacted strengthener 66 is denoted as $h_o$.

Placement of the Membrane

Figure 8:
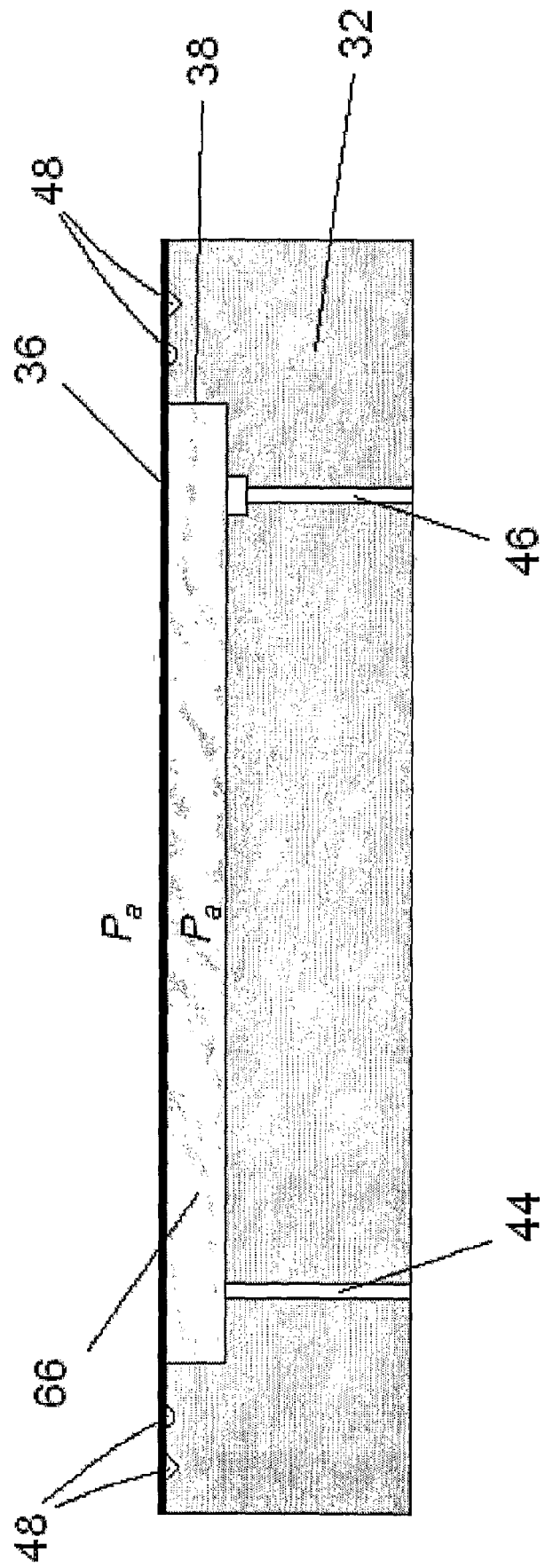
FIG. 8 is a side section view of the base mold showing a second step in a process for manufacturing a composite part.

As shown in FIG. 8, the membrane 36 is positioned on the base mold 32 in order to cover the strengthener 66 and over the grooves 48. As stated hereinabove, the base mold 32 and the membrane 36 generally delimit the strengthener chamber 38 adapted to receive the strengthener 66.

Closure of the Mold Assembly

Figure 9:
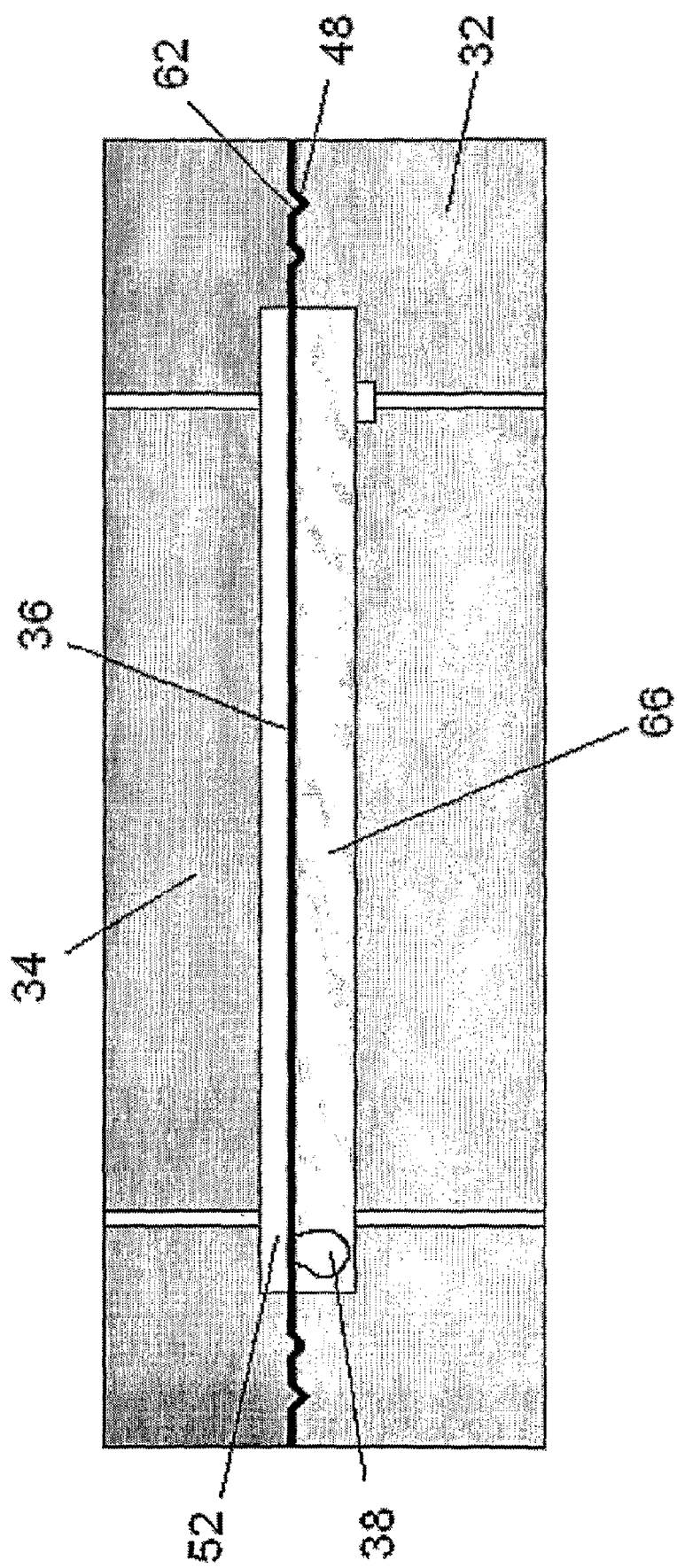
FIG. 9 is a side section view of the mold showing a third step in a process for manufacturing a composite part.

From FIG. 9, the cover mold 34 is fitted to the base mold 32 via the ridges 62 and grooves 48 assembly in order to seal the strengthener chamber 38 and the compression chamber 52 with the strengthener 66 located in the strengthener chamber 38.

Application of Vacuum to the Strengthener Chamber

Figure 10:
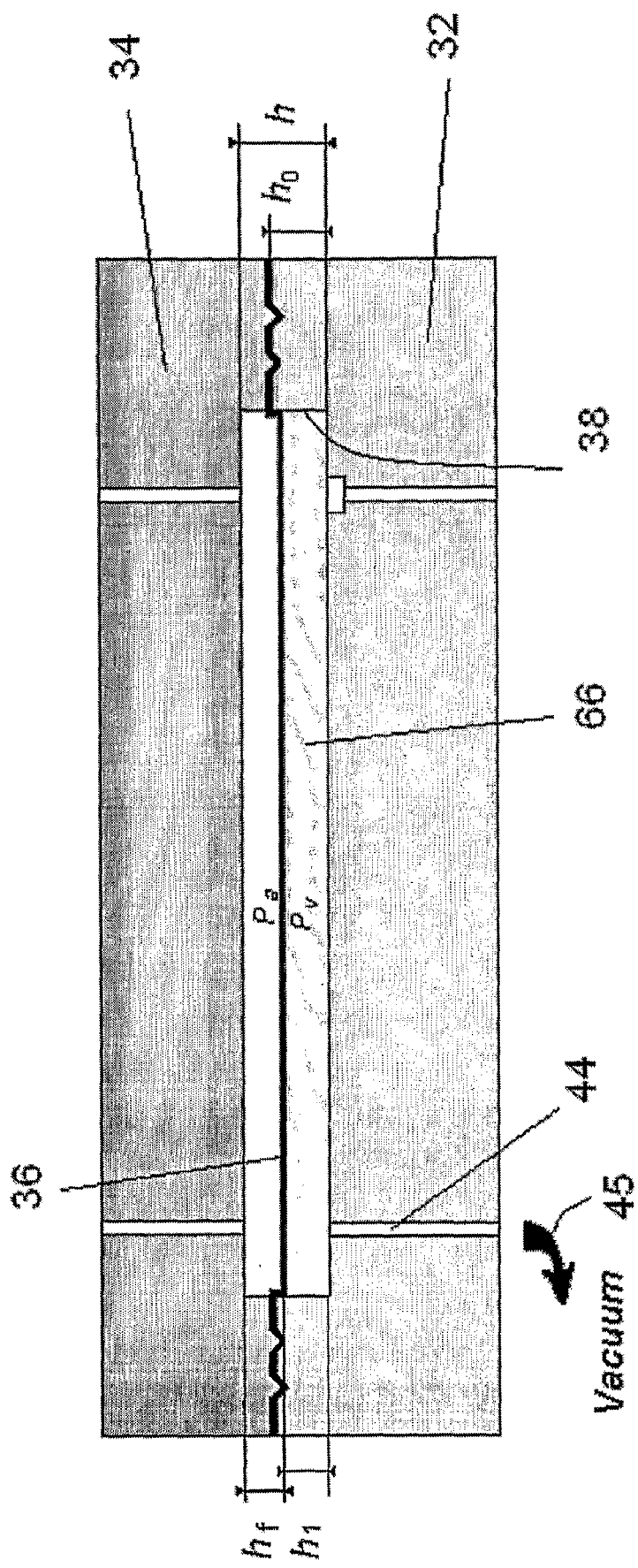
FIG. 10 is a side section view of the mold showing a fourth step in a process for manufacturing a composite part.

Optionally, pressure in the strengthener chamber 38 is changed to facilitate the manufacture of the composite material. As seen in FIG. 10, the pressure in the strengthener chamber 38 is set at a vacuum pressure $P_v$, which is generally lower than atmospheric pressure $P_a$. To change the pressure in the chamber 38, a vacuum source such as for example a vacuum pump is generally used through a connection to the evacuation outlet 44 in the base mold 32 (see arrow 45).

In this case, the resulting pressure applied to the strengthener 66, that is, the ambient atmospheric pressure $P_a$ minus the vacuum pressure $P_v$, generally compresses the strengthener 66 to a thickness $h_1$ which is less than $h_o$.

Injection of the Liquid

Figure 11:
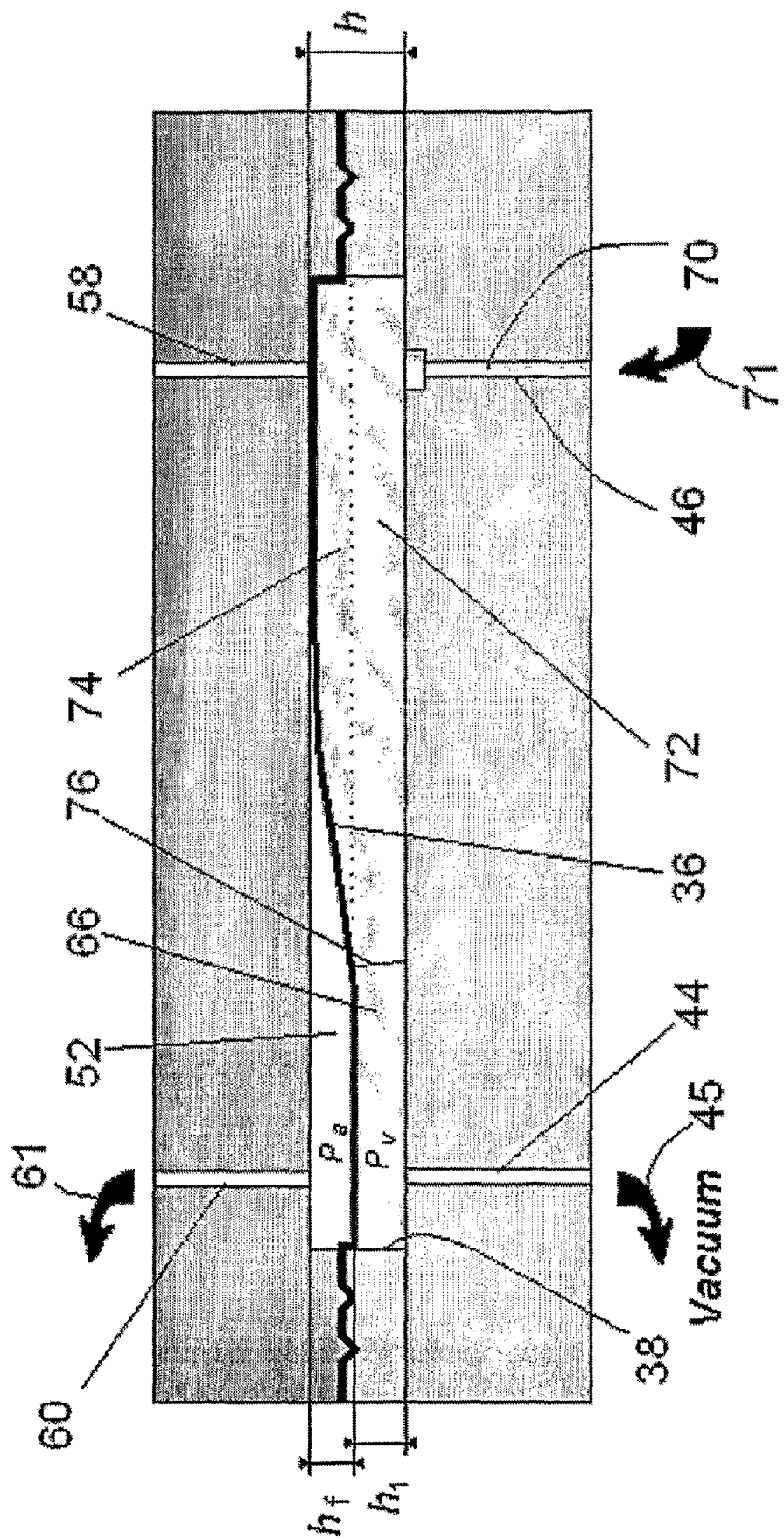
FIG. 11 is a side section view of the mold showing a fifth step in a process for manufacturing a composite part.

In FIG. 11, a predetermined quantity of matrix 70 is injected in the chamber 38 via the injection inlet 46 (see arrow 71). At first, a portion of the matrix 70 generally impregnates a fraction of the strengthener's total volume 72 near where it is injected, and moves in the strengthener 66 with a matrix flow front 76. The matrix flow front 76 gradually moves along a propagation direction generally defined from the injection inlet 46 to the evacuation outlet 44.

After injection, a portion of the matrix 70 impregnates a fraction of the strengthener's total volume 72 and another portion of the matrix called free matrix generates a deformation zone 74 by swelling the membrane 36 which deforms and occupies a portion of the compression chamber 52. The free matrix is generally the injected matrix 70 which has permeated across the strengthener or when the matrix infiltrates on the sides of the strengthener, generally between the strengthener 66 and the strengthener chamber 38.

Alternatively, the free matrix swells the membrane 36 to significantly fill the compression chamber 52. Also alternatively, the deformation zone 74 is generated by the varying thickness of the strengthener 66 saturated by the matrix and which, as a result, deforms the membrane 36.

Due to the injection of the matrix 70, the thickness $h_1$ of the strengthener chamber 38 generally increases, up to the maximal value h corresponding to the height of the gap 64.

Once the predetermined quantity of matrix 70 has been injected into the strengthener chamber 38, the matrix injection inlet 46 is closed, the fluid control aperture 58 is generally obstructed by the swollen portion of the membrane 36, while the vent 60 allows evacuation of the air contained in the compression chamber 52 (see arrow 61).

Injection of the Controlling Fluid

Figure 12:
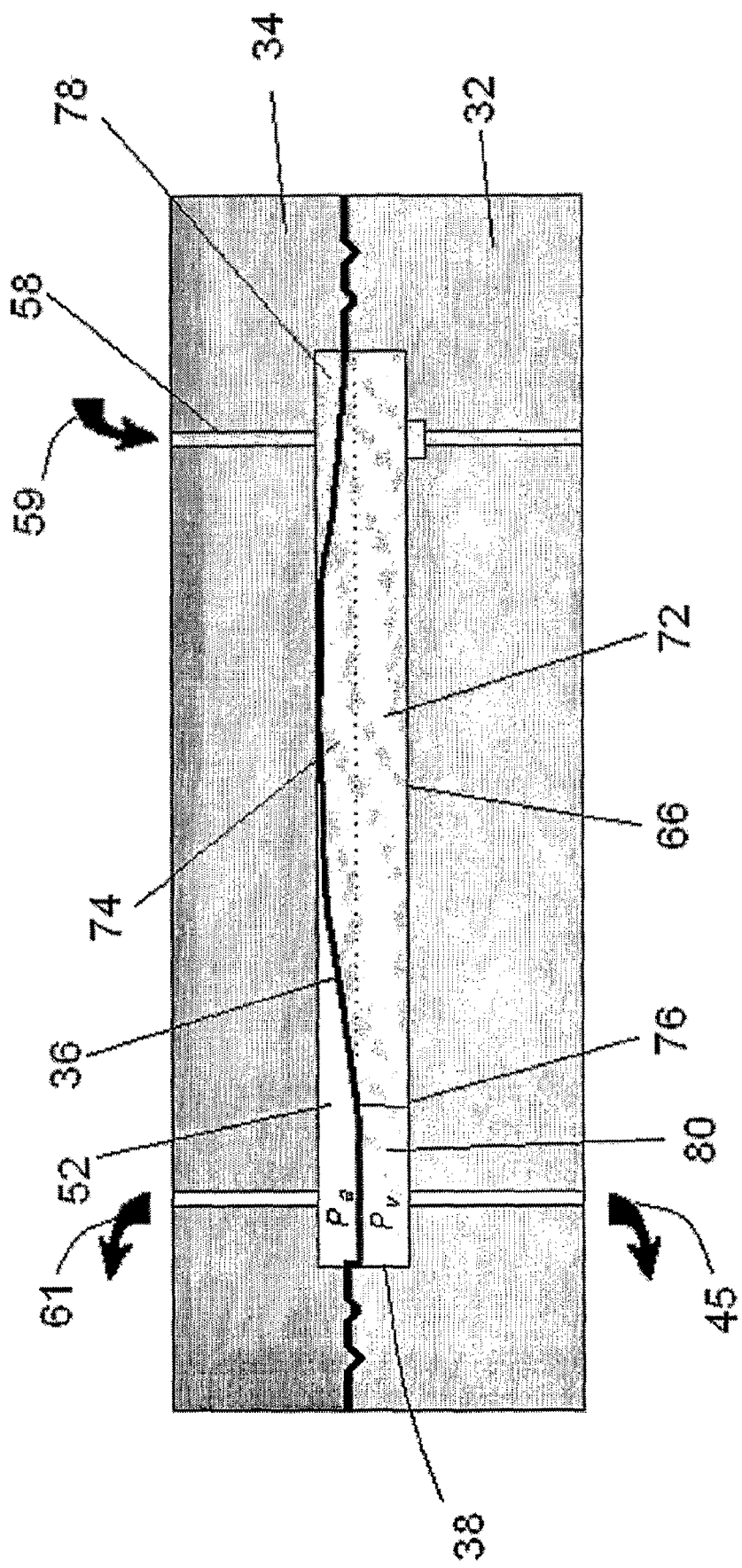
FIG. 12 is a side section view of the mold showing a sixth step in a process for manufacturing a composite part.

The controlling fluid may be either a gas or more generally an incompressible liquid such as water, oil or any other liquid meeting specified requirements. As seen in FIG. 12 the fluid 78 is injected in the compression chamber 52, through the control aperture 58 (see arrow 59), at a temperature $T_f$ and a pressure $P_f$.

The pressure applied by the controlling fluid 78 on the membrane 36 progressively reduces the deformation of the membrane 36, compacts the strengthener 66 and forces both the matrix which is already in the impregnated strengthener volume 72 and the free matrix in the deformation zone 74 along its longitudinal extension.

This step has the effect of bringing the penetration of the matrix toward the un-impregnated strengthener volume 80 and enables to control the progression of the matrix flow front 76 through the strengthener 66 along the propagation direction.

By heating the controlling fluid 78 and/or the base mold 32, the temperature inside the strengthener chamber 38 is regulated. Usually, higher temperatures generally decrease the viscosity of the matrix 70 and facilitate its penetration into the strengthener 66. Increasing the controlling fluid temperature $T_f$ also generally facilitates the progression of the matrix flow front 76 through the strengthener 66.

Compaction of the Composite Part

Figure 13:
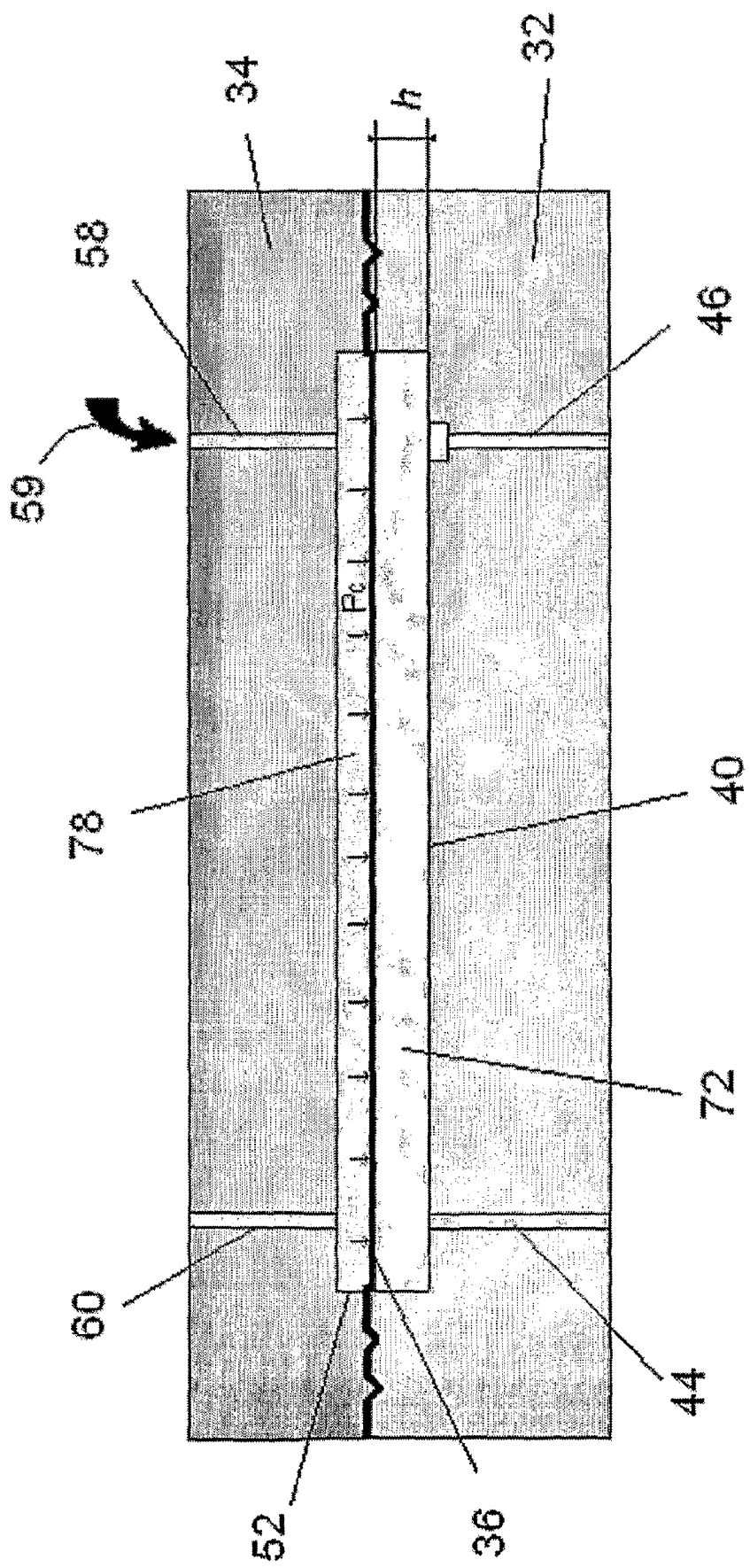
FIG. 13 is a side section view of the mold showing a seventh step in a process for manufacturing a composite part.

As seen in FIG. 13, when the compression chamber 52 is filled by the controlling fluid 78, pressure is increased up to a compaction pressure $P_c$ in order to compress the impregnated strengthener 72 via the membrane 36. This step generally completes the impregnation of the strengthener 66, increases its saturation, brings the strengthener to a given thickness h and helps to maintain the contact of the impregnated strengthener 72 with the base mold 32.

Indeed, since the application of the compaction pressure $P_c$ is isotropic (i.e. in all directions), the impregnated strengthener 72 is generally compacted uniformly, regardless of its geometrical particularities. Furthermore, it is possible to maintain the compaction pressure $P_c$ during the cure and/or solidification phase, as will be discussed in more details in the next step, to increase the saturation of the injected part and help impart the surface finish of the contact wall 40 to the injected part.

The compaction pressure $P_c$ being generally greater than atmospheric pressure, the final thickness h of the molded part may be controlled and parts with greater fiber contents can be manufactured. It should be noted that the compaction pressure $P_c$ nevertheless remains below the level that would cause permanent deformation of the cover mold 34. Accordingly, the cover mold 34 is designed to withstand the compaction pressure $P_c$.

Cure and/or Solidification of the Part

Figure 14:
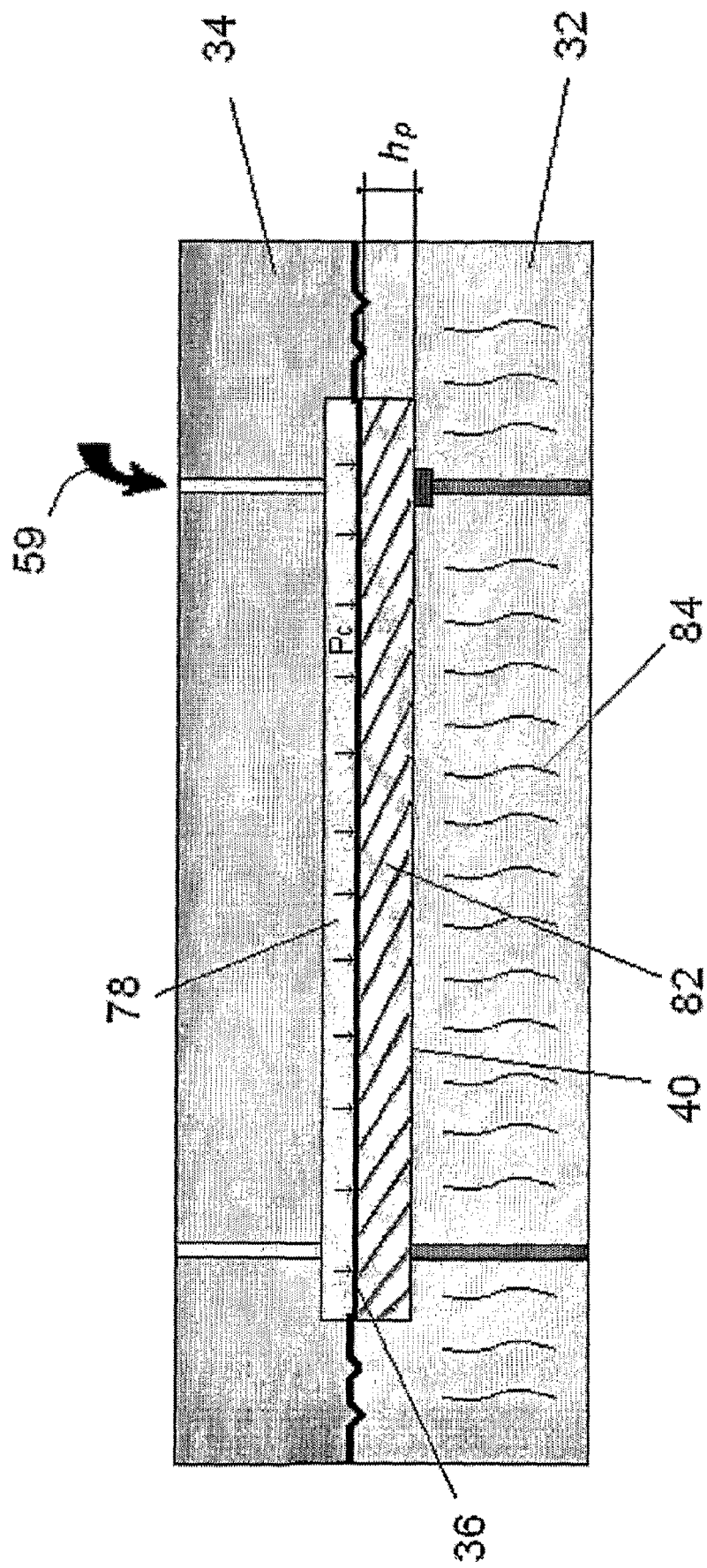
FIG. 14 is a side section view of the mold showing an eight step in a process for manufacturing a composite part.

The base mold 32 is brought to the desired temperature for the cure and/or solidification of the part 82 by means of thermal resistors 84, schematically illustrated in FIG. 14, or by any other suitable heating system or cooling system (not shown). The thermal resistors 84 are so configured as to radiate heat to the base mold 32 to provide means for regulating the temperature of the contact wall 40 of the mold 32.

During this phase, the compaction pressure $P_c$ applied in the compression chamber 52 helps provide a generally continuous contact of the composite part 82 with the contact wall 40 of the base mold 32. This contact has the effect of providing the part 82 with a generally conformed reproduction of the geometrical and surface finish of the contact wall 40, and is further optionally used in conjunction with a heating or cooling of the fluid 78, as stated hereinabove.

During the cure and/or solidification of the composite part, the mold helps to provide a generally continuous contact of the injected part 82 with the contact wall 40 which minimizes the surface waviness and roughness of the part 82 on its surface adjacent to the contact wall 40. These phenomena sometimes result from polymerization shrinkage in the case of heat-cured polymers or from matrix contraction during cooling or solidification of the part 82.

The mold assembly 30 therefore helps to control the cure and/or the solidification of the injected part 82 such that its generated surface appearance is of a generally better quality, since the surface of the injected part 82 that is adjacent to the base mold 32 optimally reproduces the finish quality of the contact wall 40. This cure and/or solidification step also helps to solidify the matrix and to control matrix cross-linking and/or micro-structure, which are the physico-chemical phenomena generally occurring during cure and/or solidification. In general, cure and/or solidification determines some physico-chemical properties of the composite part 82 such as for example mechanical resistance, anti-wear properties and so on.

Depending on the properties desired for the composite part 82 as well as the means available, the cure method alternatively uses ultra-violet (UV) light. In this case, the base mold 32, the cover mold 34 and the membrane 36 are transparent to this type of radiation.

Ejection from the Mold Assembly

Once the cure and/or solidification are completed, the temperature of the base mold 32 is lowered by shutting off the thermal resistor elements 84 and/or by using a cooling system (not shown) so configured as to decrease the temperature in the strengthener chamber 38.

Figure 15:
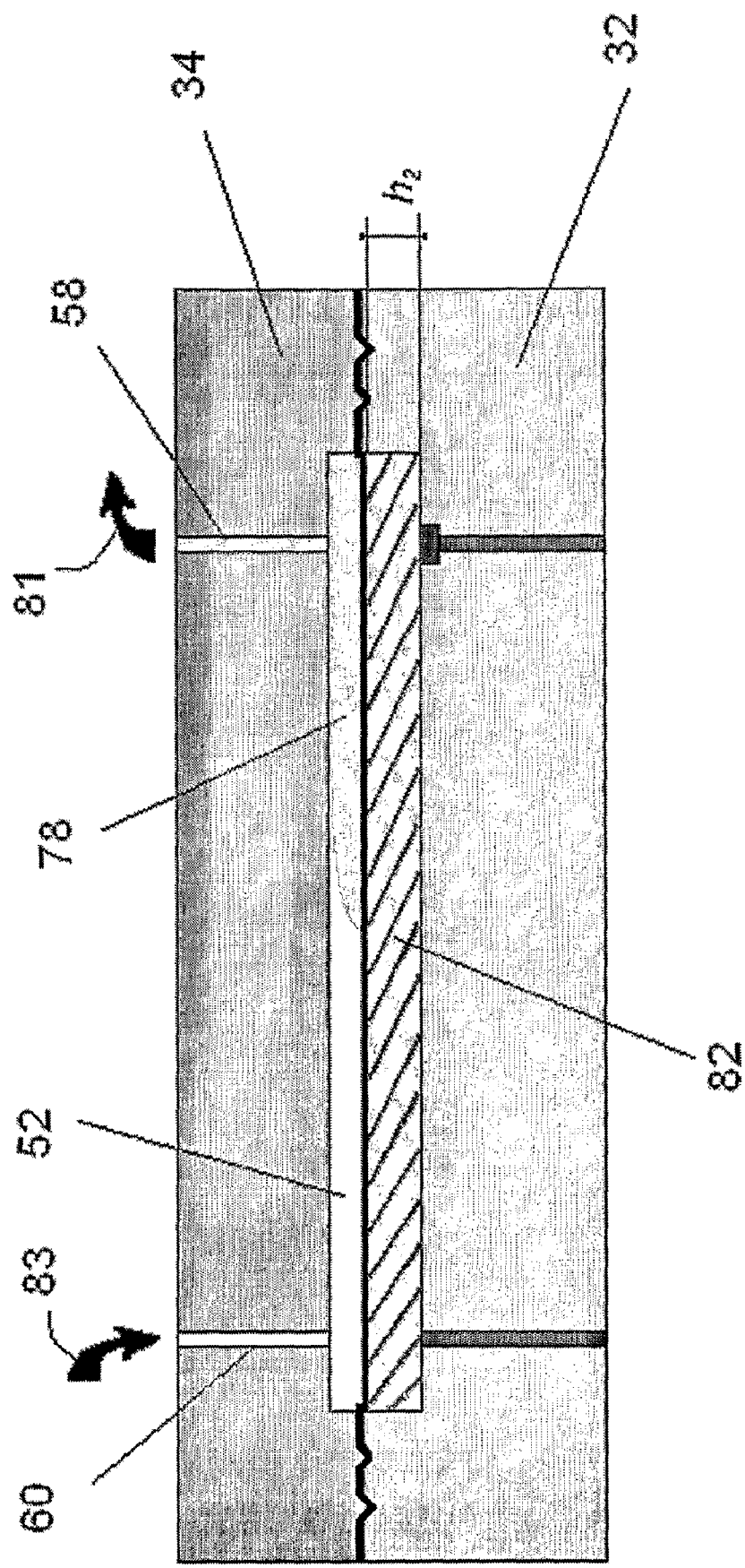
FIG. 15 is a side section view of the mold showing a ninth step in a process for manufacturing a composite part.

In the example shown in FIG. 15, ejection of the controlling fluid 78 (see arrow 81) by cold air injected at the vent 60 (see arrow 83) contributes at the same time to the cooling of the part 82 before its removal from the mold assembly 30. The fluid 78 is therefore evacuated from the compression chamber 52 by pump means (not shown) connected to the vent 60 and expelled at the fluid control aperture 58. The cooling of the composite part 82 is also alternatively achieved by conduction of cold through the base mold 32 and the cover mold 34.

Figure 16:
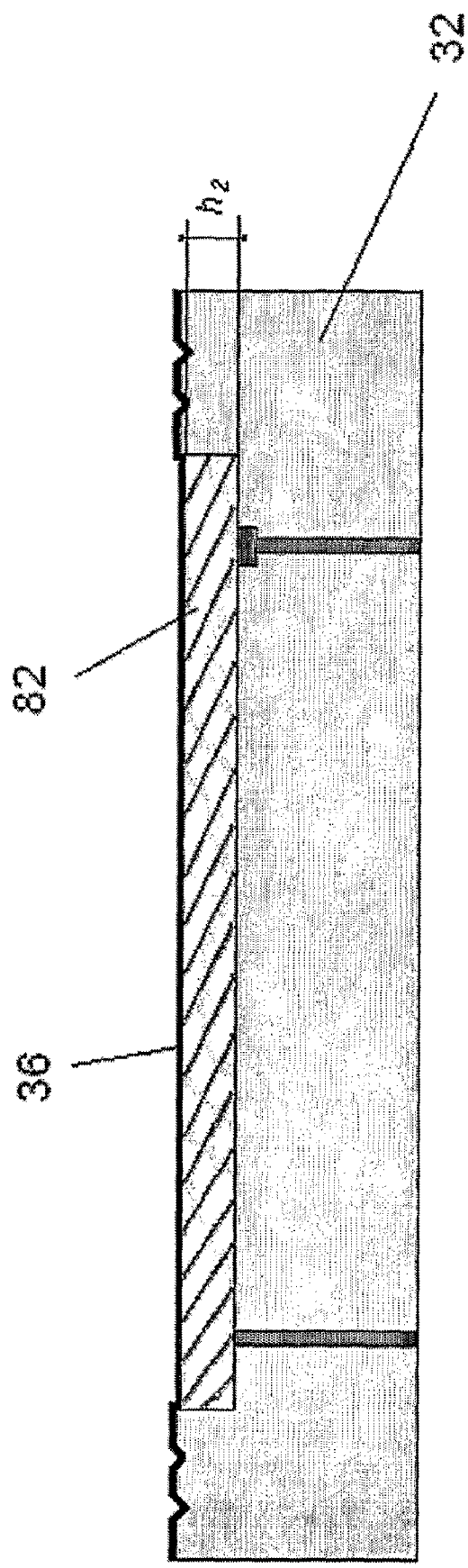
FIG. 16 is a side section view of the base mold showing a tenth step in a process for manufacturing a composite part.
Figure 17:
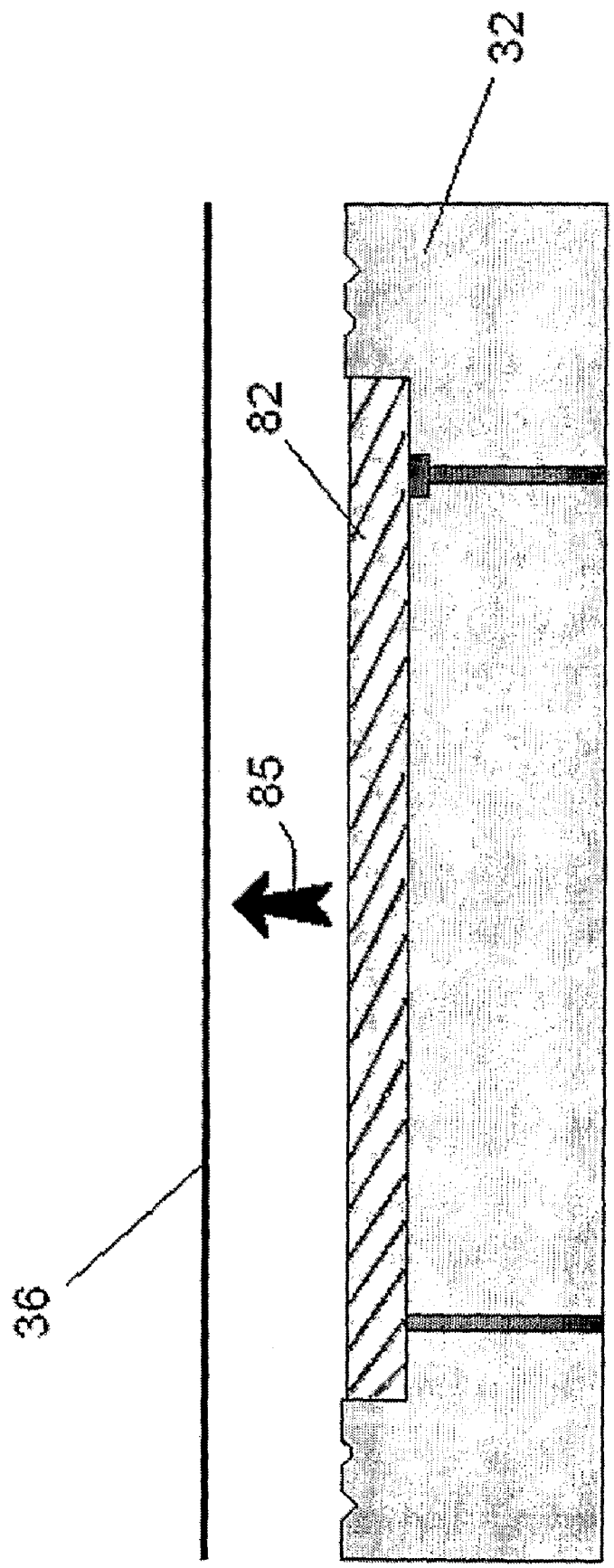
FIG. 17 is a side section view of the base mold showing an eleventh step in a process for manufacturing a composite part.

Once this fluid evacuation is completed, the mold assembly 30 is opened by removing the cover mold 34 from the base mold 32, as shown in FIG. 16. At that stage, the composite part 82 is still enclosed in the strengthener chamber 38 by the membrane 36 and has a composite thickness $h_2$. The membrane 36 is then removed (see arrow 85) from the base mold 32 containing the composite part 82, as shown in FIG. 17.

Figure 18:
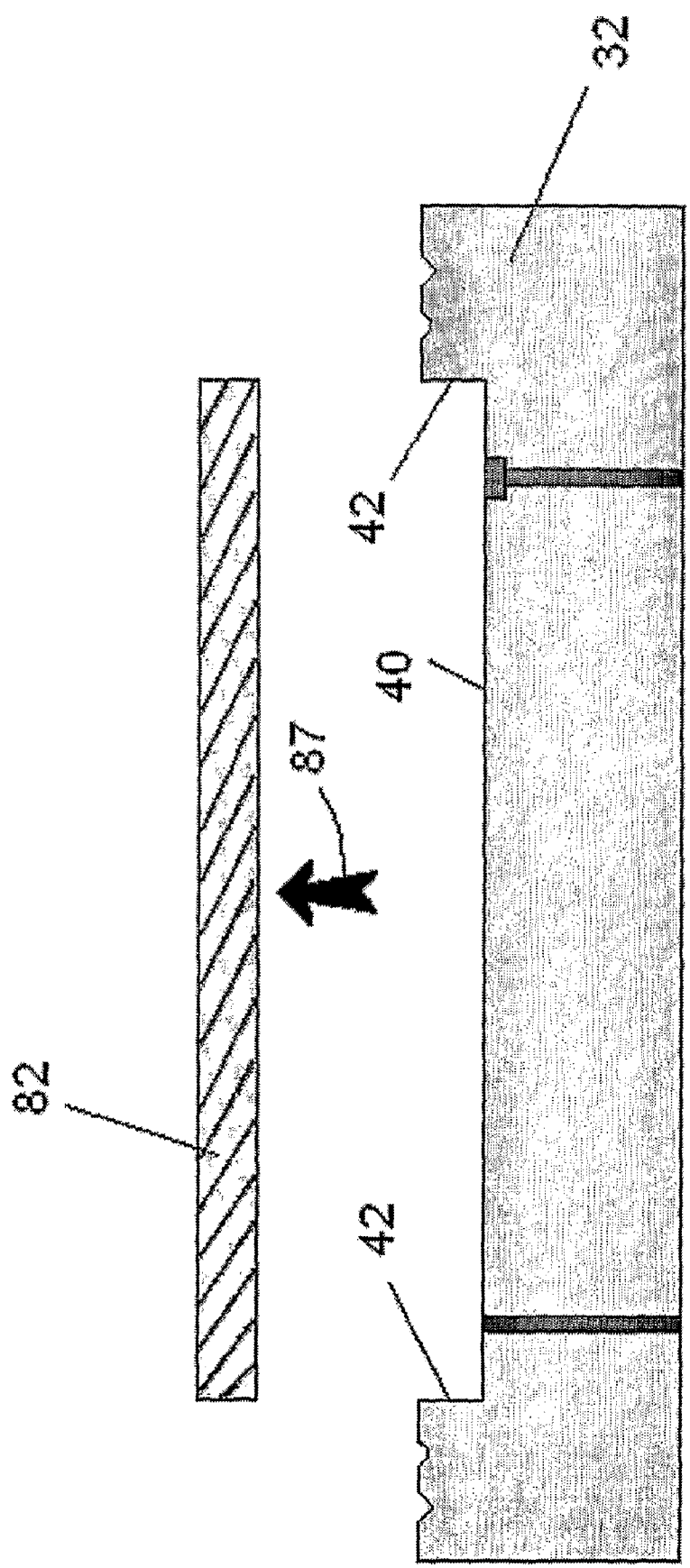
FIG. 18 is a side section view of the base mold, showing a twelfth step in a process for manufacturing a composite part.

Next, by means of usual methods of de-molding such as for example compressed air jets or mechanical ejectors (not shown), the composite part 82 is extracted from the base mold 32, as illustrated in FIG. 18 (see arrow 87). In general, de-molding is facilitated by the use of a releasing agent applied to the contact wall 40 and the peripheral walls 42 of the base mold 32 prior to placing the strengthener therein.

According to the present invention, the mold assembly 30 may be optionally configured by pre-determining the optimal thickness h of the gap 64 defined by the chambers 38, 52. This gap 64 may be determined by means of a computer simulation that helps to achieve optimal impregnation rate conditions throughout the strengthener 66, while generally minimizing the filling time.

Optionally, the total thickness h of the gap 64 does not need to be uniform along the dispersion of the strengthener 66 in the strengthener chamber 38. Indeed, a variable and adjustable thickness h helps to provide a more uniform control over the matrix progression in some portions of the strengthener 66 and allows injecting strengtheners of non uniform thickness.

For example, the adjustability of thickness h is used in cases where the strengtheners permeability characteristics need to be regulated or changed locally during injection, in cases where the final thickness of the composite part is not uniform, in cases where divergent or convergent flow zones exists within the strengthener chamber 38 or in cases where inserts (not shown) are included in the gap 64 or mounted on the base mold 32 and the cover mold 34.

Also optionally, the mold assembly 30 including the base mold 32, the cover mold 34 and the membrane 36 is further provided with a means for achieving dynamic consolidation of the liquid-saturated strengthener as in the VRTM (Vibration Resin Transfer Molding) variation of the RTM process for example, or by transmitting the mechanical vibration energy directly to the fluid.

If dynamic consolidation is used as in the VRTM process during the "compaction of the part" step described hereinabove, the vibration so imposed on the impregnated strengthener 66 contributes to expel the residual gaseous phase which is sometimes entrapped in the pores of the fibrous strengthener at the end of the compaction phase, before total solidification of the matrix.

Also optionally and as introduced in the steps of "Injection of the controlling fluid" and "Solidification of the part", heating and cooling systems may be included into the mold assembly 30. The heating and cooling systems generally involve one or both molds 32, 34 or the controlling fluid 78 during the manufacture of the composite part and may be achieved by heat transfer such as for example conduction, convection and radiation.

A mold assembly and a method of using the mold assembly according to various embodiments of the present invention will now be described with respect to FIGS. 19 to 32. For concision purposes, only the differences between the mold assemblies and processes of the various following embodiments and the mold assembly and process illustrated in FIGS. 1 to 18 will be described hereinbelow.

Figure 19:
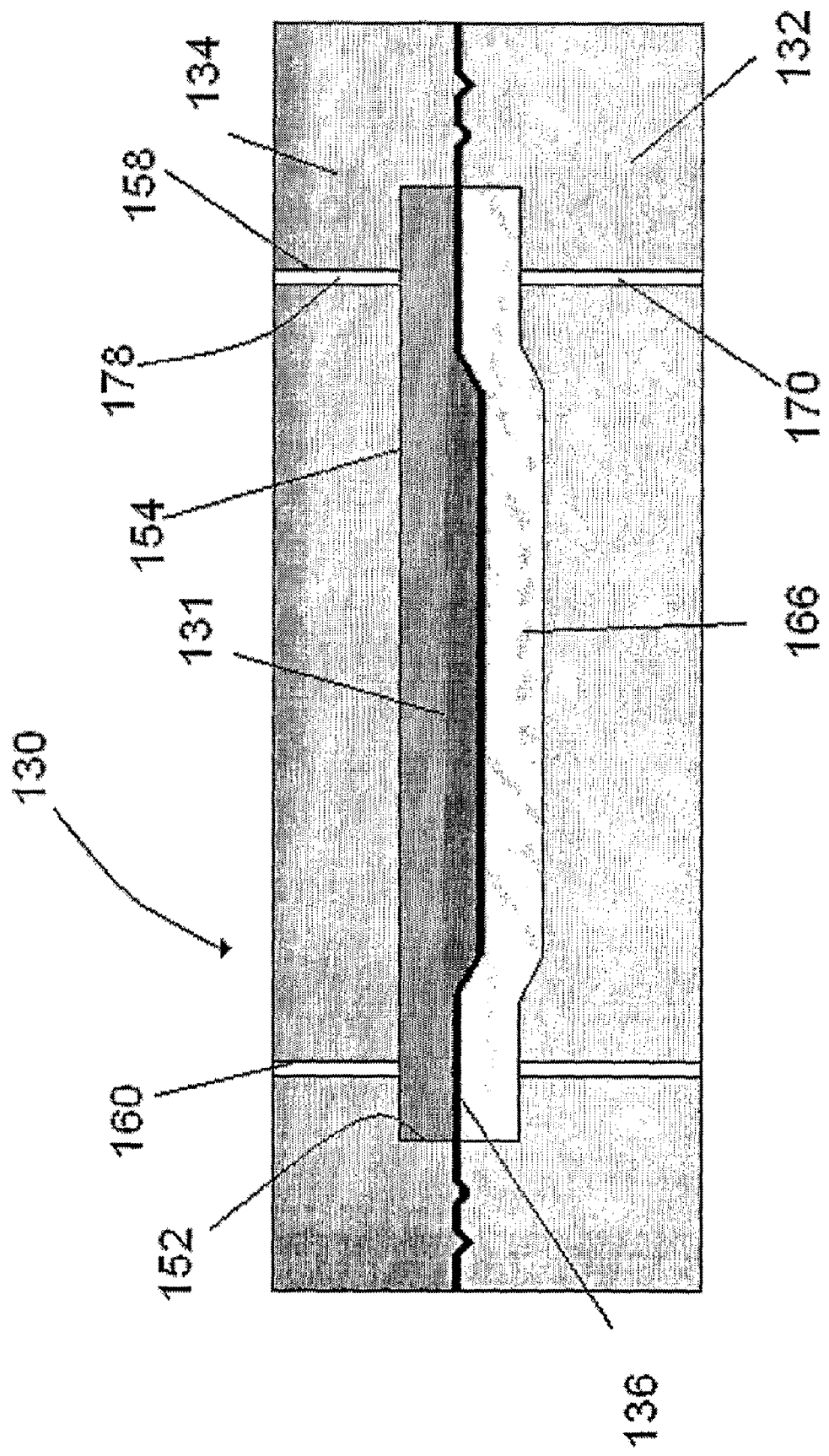
FIG. 19 is a side section view showing a mold according to a second embodiment of the present invention.

A mold assembly 130 and a process of manufacturing a composite part according to a second embodiment of the present invention are illustrated in FIG. 19.

In this embodiment, the mold assembly 130 includes a deformable member, show in the illustrative embodiment as a membrane 136 and a deformable element 131. The deformable element 131 is provided in the compression chamber 152 and has the effect of generally reducing the volume of controlling fluid injected into the compression chamber 152 via the fluid control aperture 158 and ejected via the vent 160.

The deformable element 131 is generally porous and made from elastic material such as, for example, a foam polymer or any other type of open or closed-pore material. By being machined on its surface facing the strengthener 166, the deformable element 131 helps impose a shape on the composite part being manufactured. The other surface of the deformable element 131 faces the compression wall 154 of the cover mold 134.

In operation, when injected in the mold assembly 130 by an orifice in the cover mold (not shown), the deformable element 131 occupies a certain volume of the compression chamber 152 while still facilitating, due to its deformability, the flow of the matrix 170 through the strengthener 166.

Once the matrix 170 injection is completed, a minimized quantity of controlling fluid 178 is then injected into the compression chamber 152 to control the penetration of the matrix 170 into the strengthener 166. The pressure applied to the fluid 178 is transmitted to the strengthener 166 through the deformable element 131. In the case of closed-pore deformable elements 131, the fluid control aperture 158 and the vent 160 are in communication with the membrane 136 via the deformable element 131. Injection of the controlling fluid 178 may generate a film (not shown) in the compression chamber 152, either between the deformable element 131 and the compression wall 154 or between the membrane 136 and the deformable element 131.

Alternatively, a series of grooved channels (not shown) are machined on the surface of the deformable element 131 that is closest to the strengthener 166 to participate in transmitting pressure to the strengthener 166. In that case, the membrane 136 deforms in operation and cooperates with the grooves (not shown) of the deformable element 131.

It is to be noted that the deformable element 131, instead of being shaped, is also alternatively injected directly into the cavity created by the base mold 132 and the cover mold 134 via the fluid control aperture 158. The mold 132 would nevertheless already have to contain a first strengthener 166 in order for the injected deformable element 131 to take the imprint of the strengthener 166.

In this embodiment generally, if the membrane 136 is removed, the placement or the injection of the deformable element 131 in the compression chamber 152 may be used to produce a composite sandwich part with the deformable element 131 as core. In that case, a strengthener 166 is placed next to the deformable element 131 and the controlling fluid 178 is replaced by the matrix 170.

Figure 20:
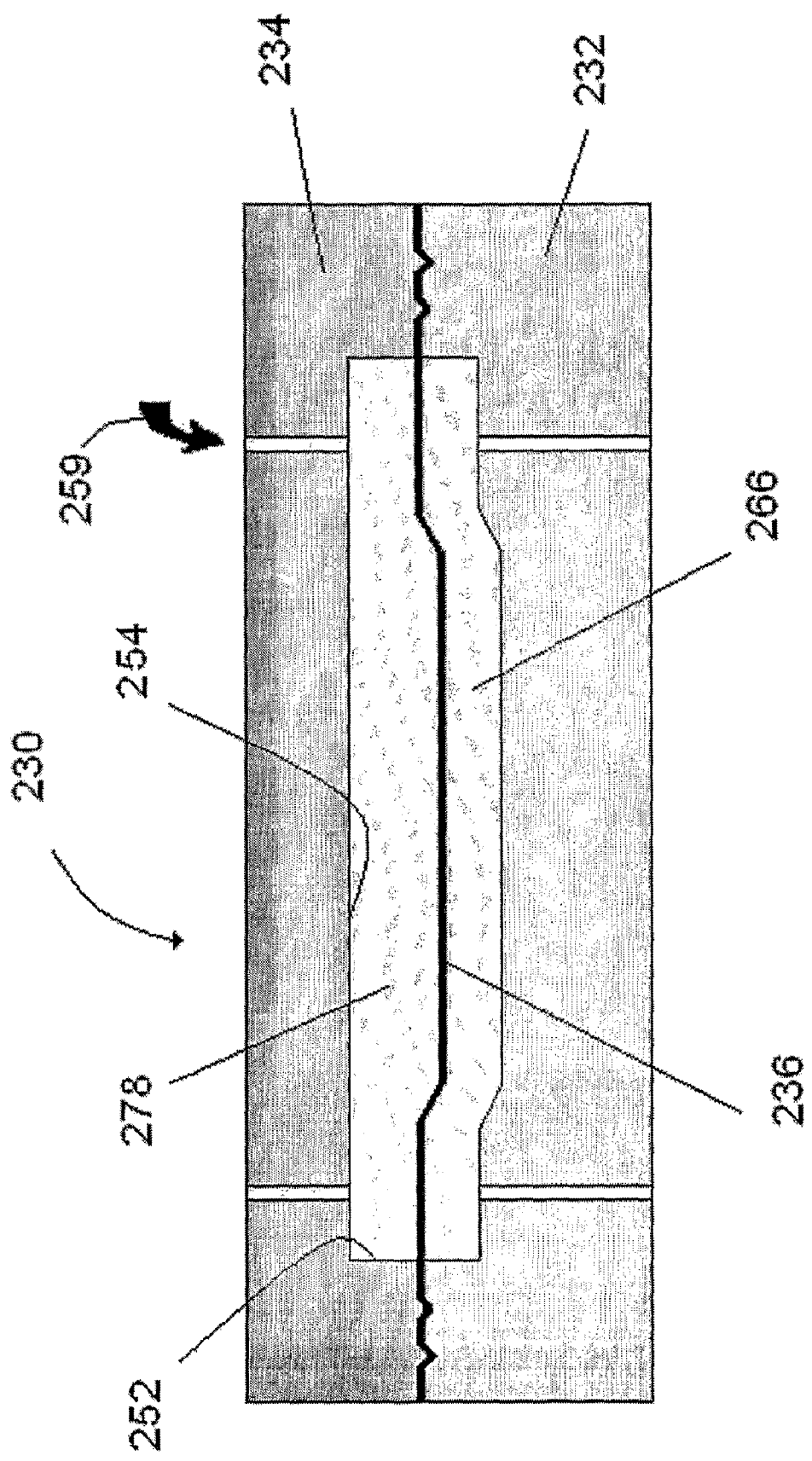
FIG. 20 is a side section view showing a mold according to a third embodiment of the present invention.
Figure 21:
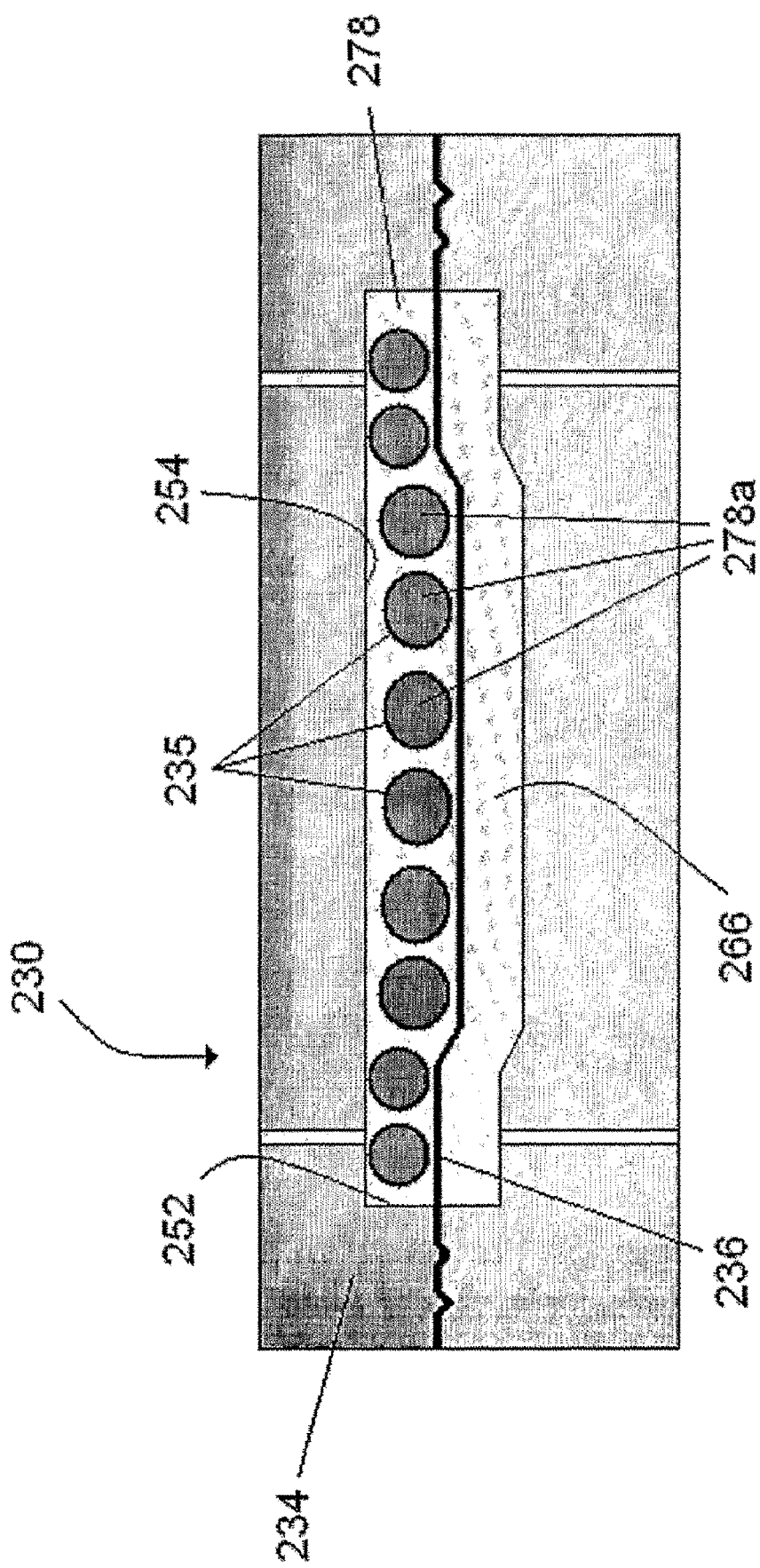
FIG. 21 is a side section view showing a step of compression generated by tubes of the mold of FIG. 20.
Figure 22:
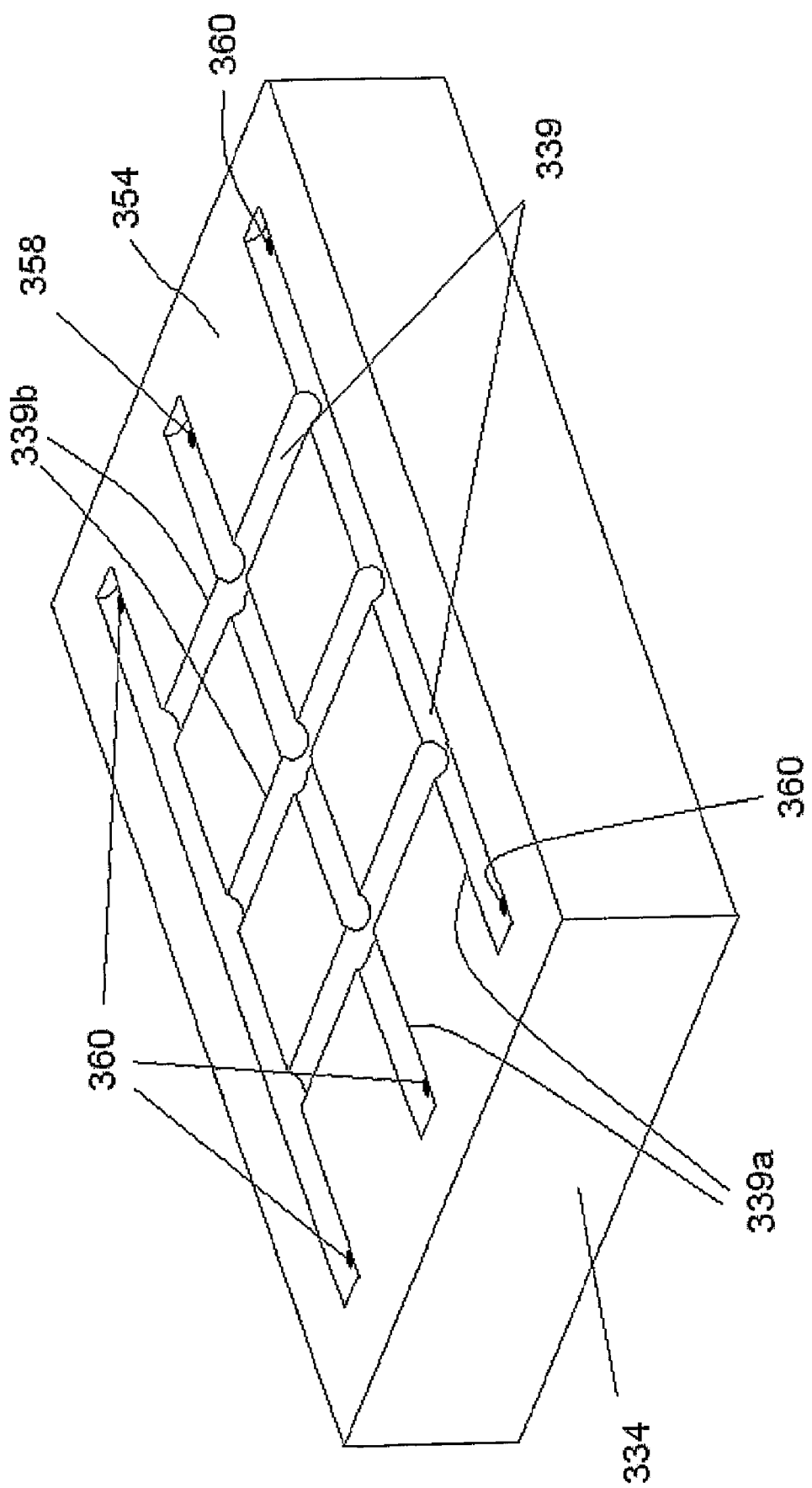
FIG. 22 is a partial isometric view showing a cover mold according to a fourth embodiment of the present invention.
Figure 23:
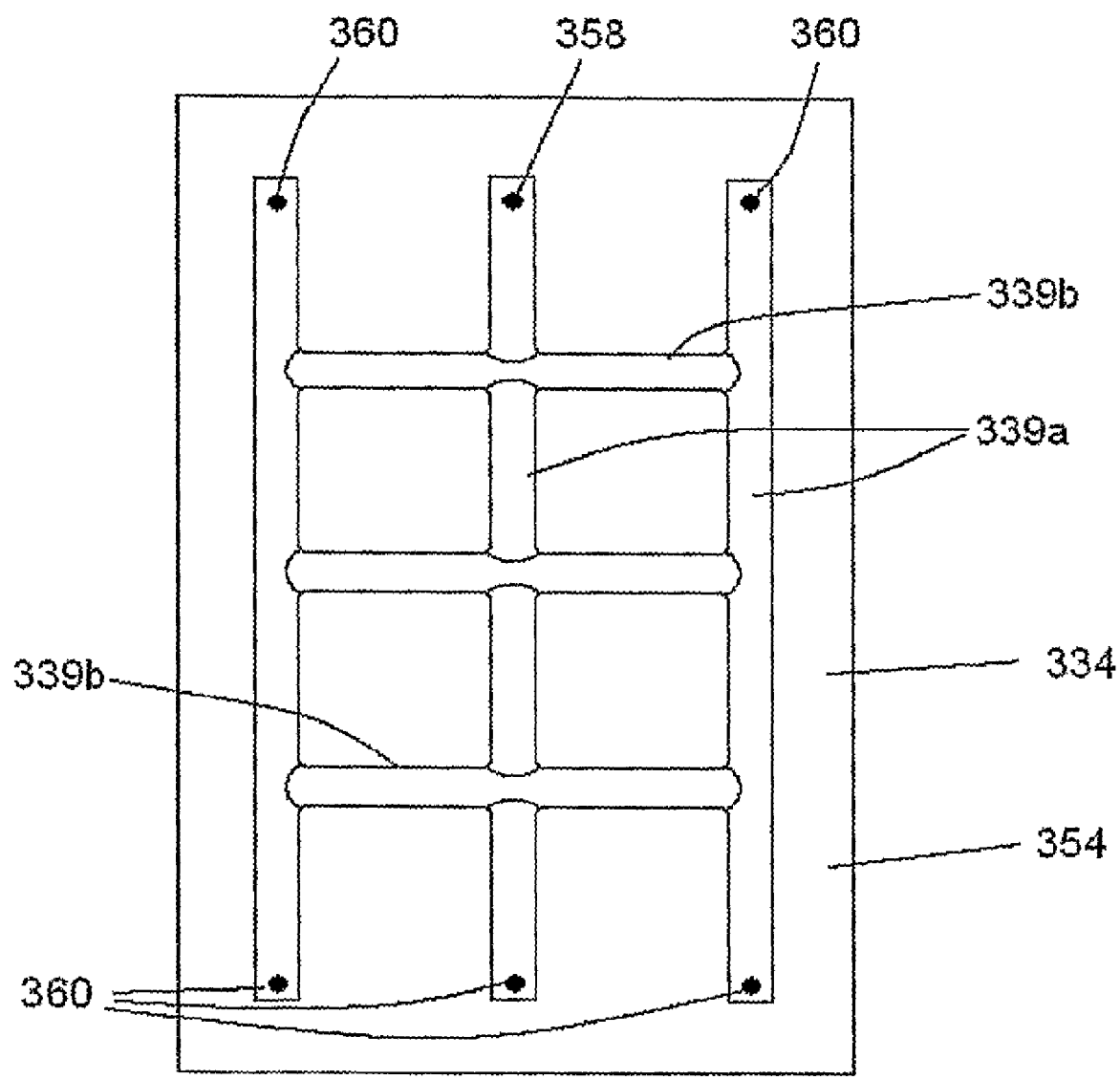
FIG. 23 is a top plan view showing the fluid passage network of the cover mold of FIG. 22.

A mold assembly 230 and a process of manufacturing a composite part according to a third embodiment of the present invention are illustrated in FIGS. 20 and 21.

In this embodiment, the strengthener 266 is located in the base mold 232 and covered with the membrane 236 under which a vacuum may be drawn. The cover mold 234 includes a compression chamber 252 which allows pressurizing at greater than atmospheric pressure, with the aid of either a gas or a liquid.

The cover mold 234 needs not be machined in the compression chamber 252 and may include compartmentalized portions (not shown) delimited by the compression wall 254 which are so configured as to be independently movable toward the compression chamber 252 and the strengthener 266.

In operation, the strengthener 266 is first pressurized by compressed gas injected in the compression chamber (see arrow 259), by incompressible fluid or by a combination of incompressible fluid and pressurized tubes, which will further be described hereinbelow. The compressed gas generally compresses the strengthener 266 and controls the membrane 236 deformation during injection. If the cover mold 234 includes compartmentalized portions (not shown), they may be positioned at various levels with respect to the membrane 236 to control the deformation of the membrane 236 after injection of the matrix in the strengthener 266 and via the pressure exerted on the compressed gas or control fluid.

With the incompressible fluid, isotropic compression is exerted on the strengthener 266. Due to the non-compressibility of the fluid 278, local deformations of the membrane 236 in the saturated zone of the strengthener 266 generally imply a deformation in the opposite direction and of equivalent volume in the non-saturated zone of the strengthener 266.

With the combination of an incompressible fluid 278 and pressurized tube 235 extending in the compression chamber 252, as illustrated in FIG. 21, a controllable isotropic pressure is exerted on the strengthener 266 and the compression chamber 252 by a tube 235 provided into specific locations above the strengthener 266. The tube 235 is deformable under pressure and includes at least one tube closable on both extremities. At least one extremity of the tube 235 is mounted through the cover mold 234 for operability while composite parts are being manufactured.

In operation, the pressure of the control fluid 278 is controlled by changing the pressure in the tube 235. By deforming under pressure while injected by a fluid source 278a, the tube 235 either directly physically compresses the membrane 236 and the strengthener 266 or indirectly compresses the membrane 236 and the strengthener 266 via the pressure exerted on the control fluid 278 in the compression chamber 252.

It should be noted that in the second embodiment, the temperature in the compression chamber 252 may also be modified and controlled via the pressurization fluid. With the use of the tubes 235, the heating and cooling of the strengthener 266 may be achieved through the incompressible fluid, while the tubes 235 provide means for evacuating or dissipating a certain amount of heat or cold from the mold assembly 230.

A mold assembly 330 and a process of manufacturing a composite part according to a fourth embodiment of the present invention are illustrated in FIGS. 22 to 25.

In this embodiment, the cover mold 334 includes a machined or imprinted channel network on the compression wall 354 which faces the strengthener 366 when the cover mold 334 is mounted on the base mold 332. The network is so configured as to allow the matrix to spread over an optimized surface of the strengthener 366, before using the controlling fluid 378.

The network includes a plurality of passages 339 which are shown in the illustrative embodiment as a generally rectangular grid or a set of channels including longitudinal passages 339a and transversal passages 339b. The distance between the compression wall 354 and the membrane 336 is sufficiently small to limit the space in which the matrix flows above the strengthener 366.

It is to be noted however that the geometry of the network, including the shape and configuration of the passages 339, is generally designed to adapt to the part to manufacture, in order to favor matrix penetration into specified zones and zones of complex shape of the strengthener 366 and to minimize the average movement of the matrix from the time it is injected in the mold assembly 330 to the moment it impregnates the strengthener 366. Generally, the passages 339 are of dimensions such that they can receive a significant portion of the amount of matrix 370 required to wet the strengthener 366 completely. Optionally, the transversal passages 339b are generally extending in alignment with the diffusion passages 350 and at least one longitudinal passage 339a is generally extending in alignment with an injection inlet 346.

Figure 24:
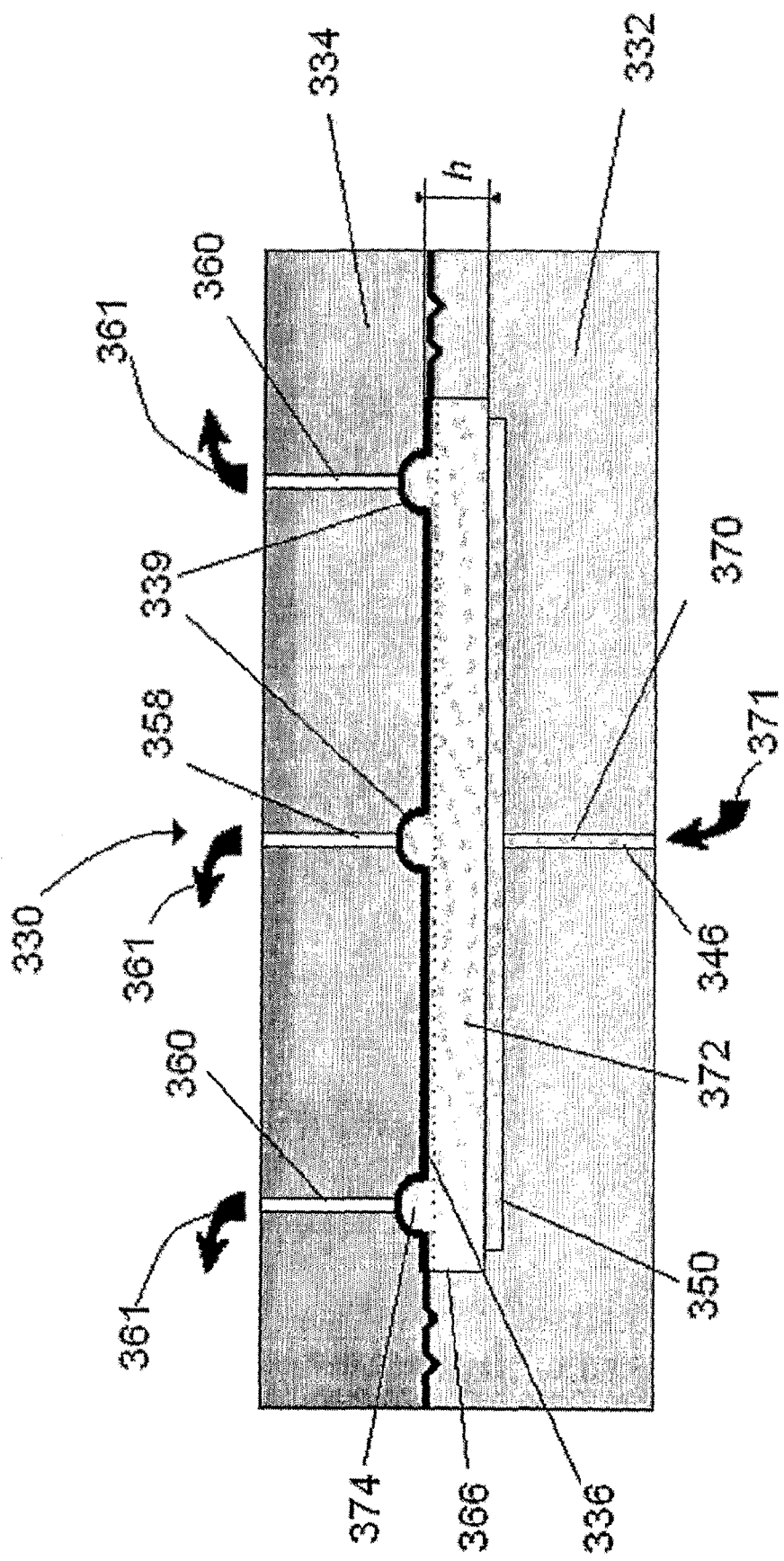
FIG. 24 is a side section view showing an impregnation step in the mold according to the fourth embodiment of the invention.

In operation and during injection of the pressurized matrix 370 via the injection inlet 346 (see arrow 371) and the diffusion passages 350 (only one shown), a portion of the strengthener's total volume 372 is impregnated by the matrix. The free matrix generates the deformation zone 374 and deforms the membrane 336 which mates with the passages 339 of the network, expelling the excess of air from the cover mold 334 through the vents 360 (see arrow 361), as seen in FIG. 24.

Figure 25:
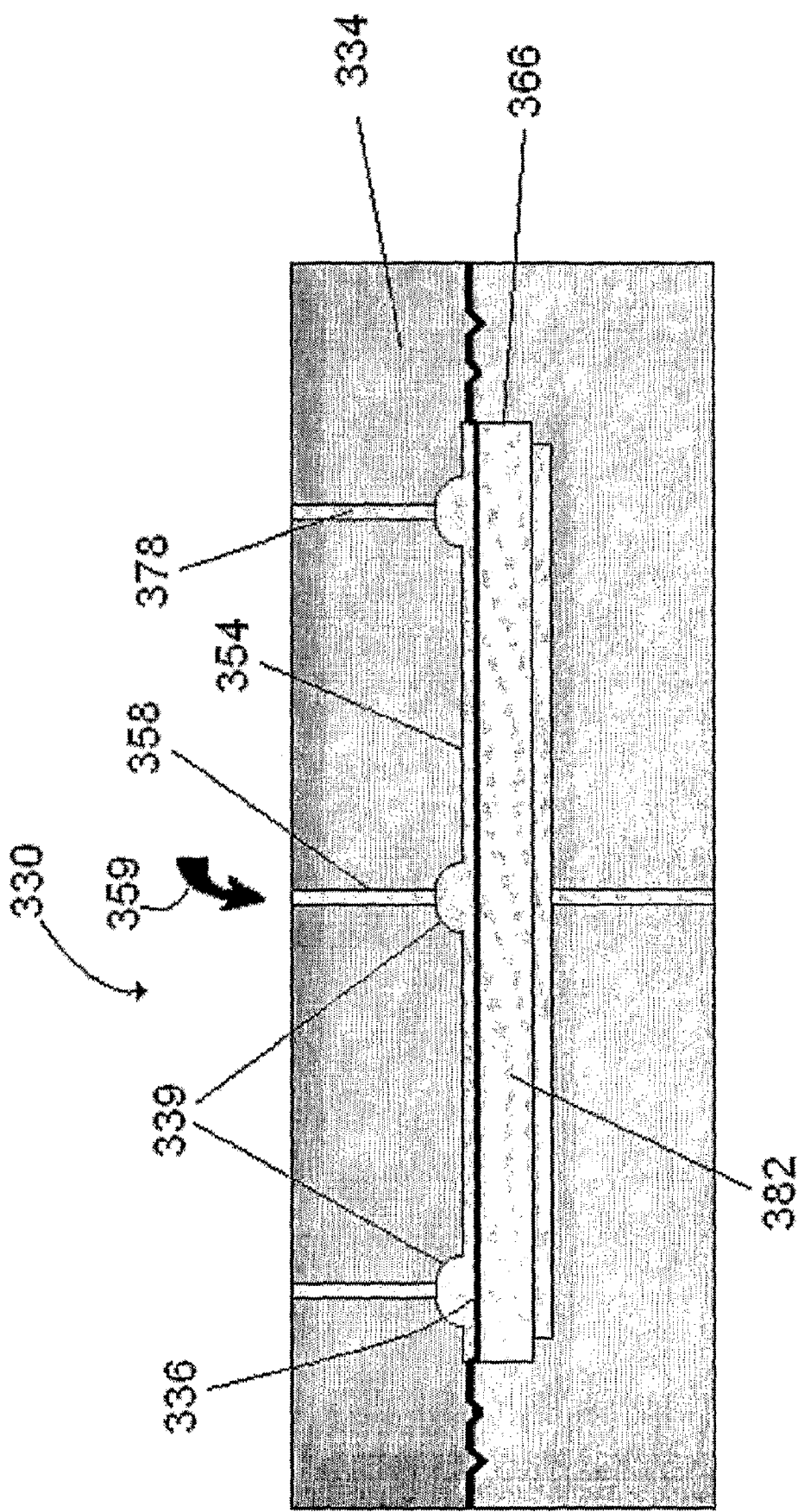
FIG. 25 is a side section view showing a fluid injection step in the mold of FIG. 24.

From FIG. 25, it is shown that the injection of the controlling fluid 378 via the fluid control aperture 358 (see arrow 359) propagates in the passages 339 and above the membrane 336 to force the free matrix into the strengthener 366 and favor a complete impregnation of the strengthener in the composite part 382.

Figure 26:
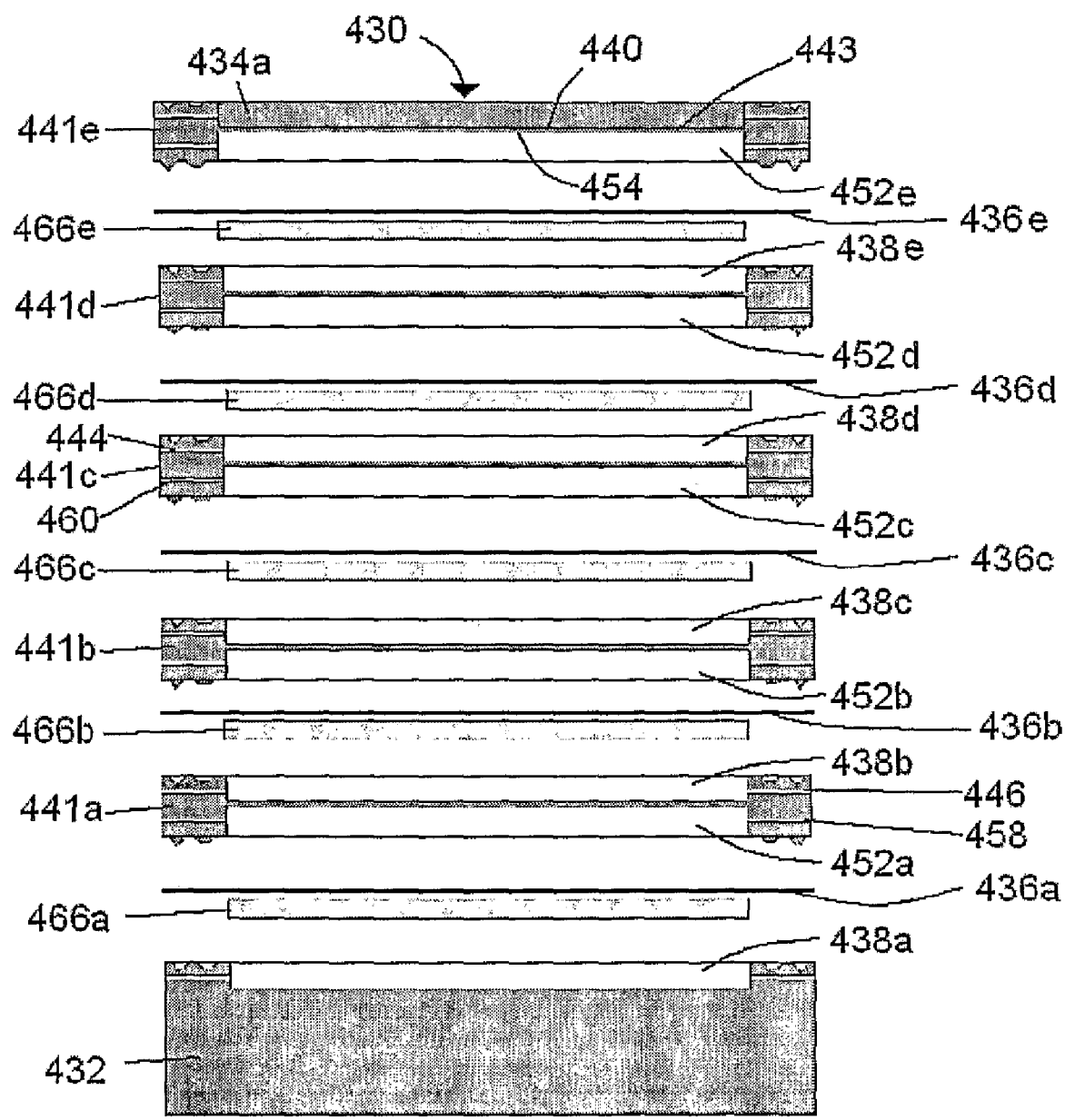
FIG. 26 is an exploded side section view showing a mold according to a fifth embodiment of the present invention.
Figure 27:
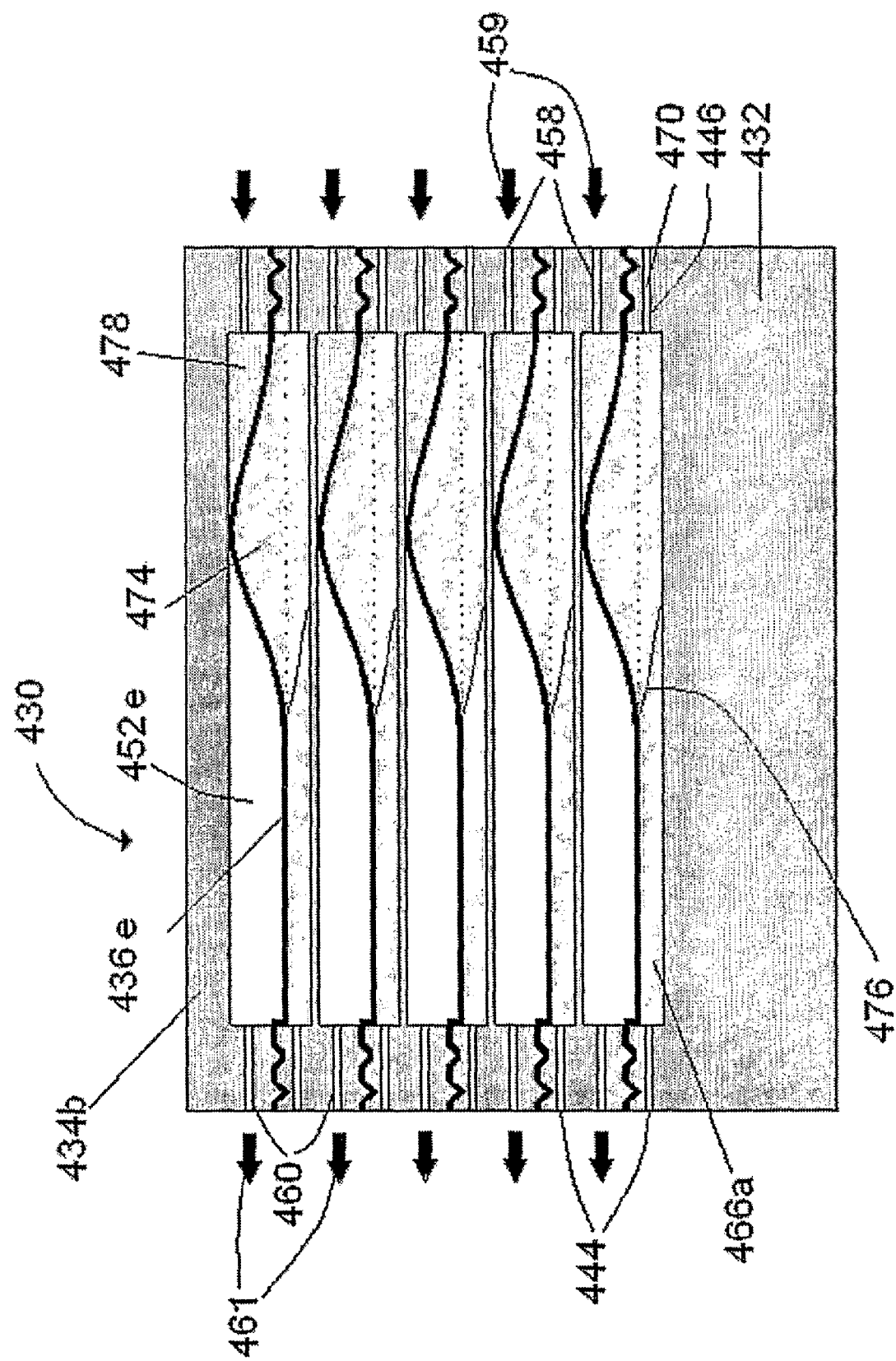
FIG. 27 is a side section view showing a fluid injection step in the mold of FIG. 26.
Figure 28:
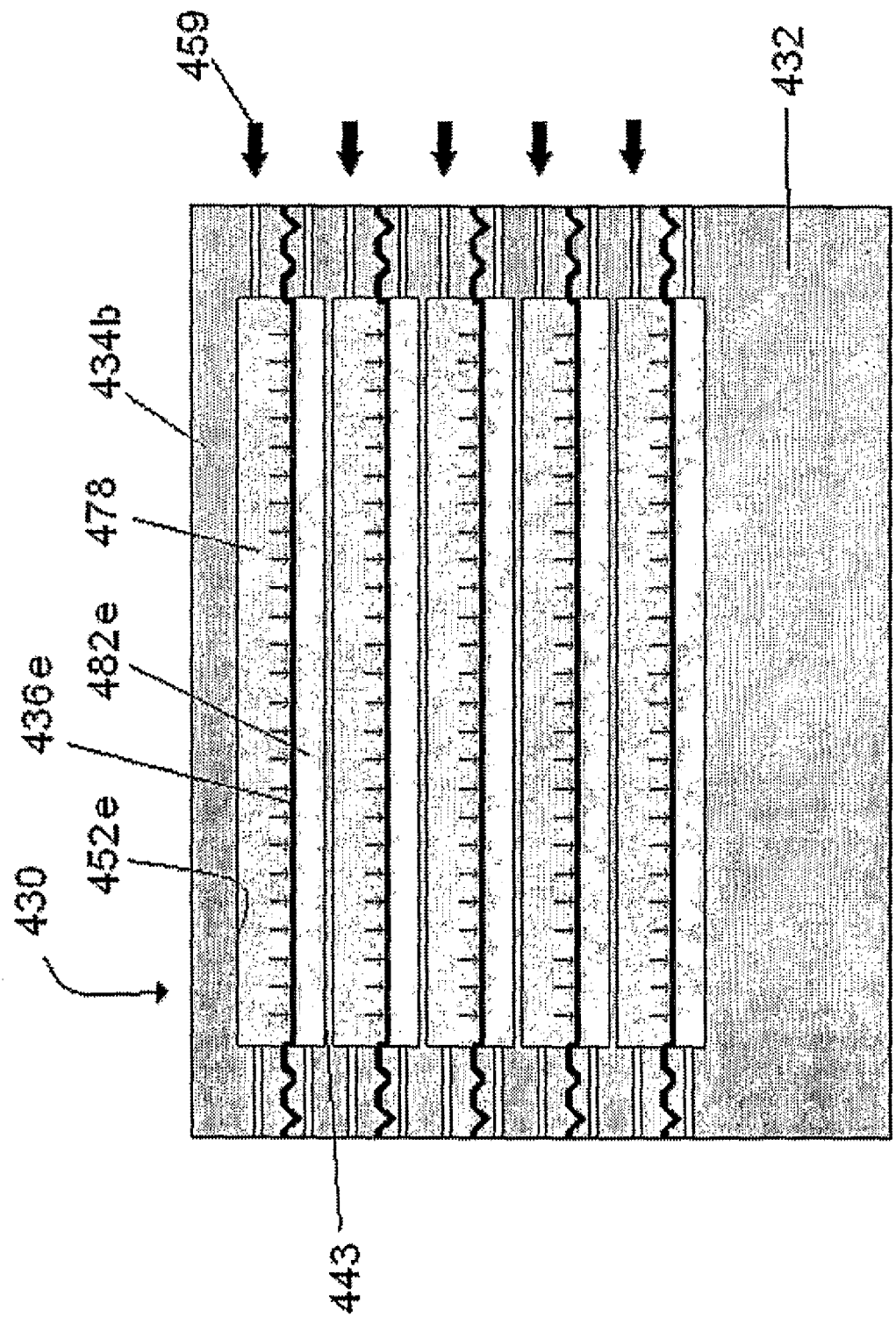
FIG. 28 is a side section view showing a compression step in the mold of FIG. 26.
Figure 29:
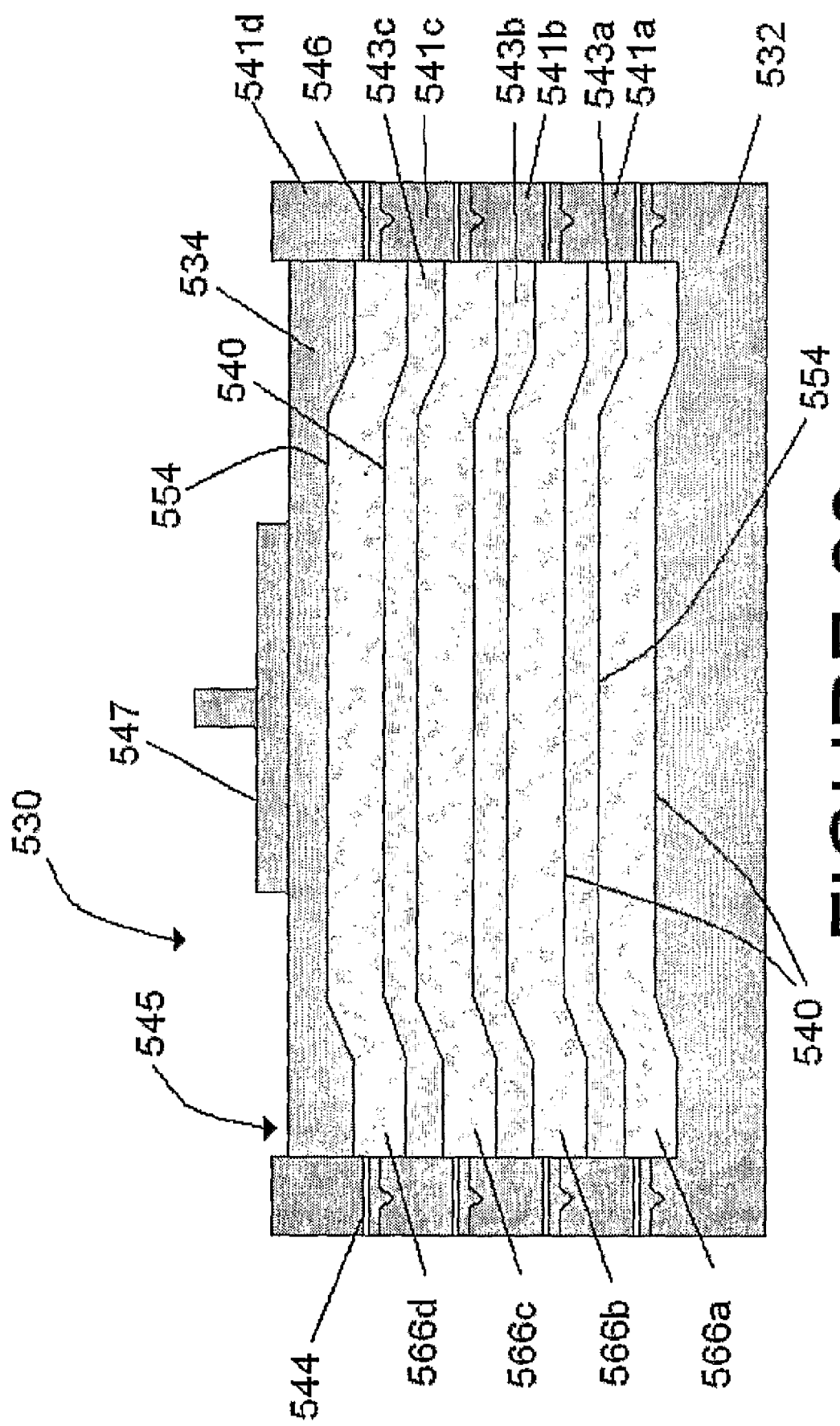
FIG. 29 is a side section view showing a mold according to a sixth embodiment of the present invention.

A mold assembly 430 and a process of manufacturing a composite part according to a fifth embodiment of the present invention are illustrated in FIGS. 26 to 28.

In this embodiment, the mold assembly 430 allows the simultaneous manufacture of several composite parts using a base mold 432 and a plurality of rigid frame assemblies 441a, 441b, 441c, 441d, 441e so configured as to define a plurality of superimposed double-chamber layers. Each layer includes a strengthener chamber 438a, 438b, 438c, 438d, 438e, a respective membrane 436a, 436b, 436c, 436d, 436e and a respective compression chamber 452a, 452b, 452c, 452d, 452e.

In the illustrative embodiment, each frame assemblies 441a, 441b, 441c, 441d, 441e includes a separator 443 made of metal or of a more or less rigid foam, defining on one side the contact wall 440 and on the other side the compression wall 454 as described hereinabove. On the side of each compression wall 454, at least one fluid control aperture 458 and at least one vent 460 extend through each frame assemblies 441a, 441b, 441c, 441d, 441e. Also, on the side of each contact wall 440, at least one injection inlet 446 and at least one evacuation outlet 444 extend through each frame assemblies 441a, 441b, 441c, 441d, 441e. The base mold 432 and the frame assemblies 441a, 441b, 441c, 441d, 441e are mounted or stacked one on top of the other as described hereinabove.

In the illustrative embodiment of FIG. 26, the last frame assembly 441e includes a cover reinforcement 434a which is mounted over its separator 443 to provide for additional rigidity and integrity of the mold assembly 430 during the manufacturing of the composite parts. Alternatively, as illustrated in FIGS. 27 and 28, the last frame assembly 441e is replaced by a cover mold 434b which has a similar configuration as the previously described cover molds.

In operation, each strengthener 466a, 466b, 466c, 466d, 466e is placed in one strengthener chamber 438a, 438b, 438c, 438d, 438e and impregnated with matrix injected via the injection inlets 446 of each frame assemblies 441a, 441b, 441c, 441d, 441e, as illustrated in FIG. 27. The matrix 470 is optionally injected simultaneously into all strengthener chambers 438a, 438b, 438c, 438d, 438e, or with a delay between each sequential injection of matrix in the strengtheners.

The controlling fluid 478 is then injected into the compression chambers 452a, 452b, 452c, 452d, 452e via the fluid control apertures 458 (see arrows 459). The excess of fluid contained in the compression chambers 452a, 452b, 452c, 452d, 452e is expelled via the vents 460 (see arrows 461). The principle of matrix flow front 476 progression and the movement of the membranes 436a, 436b, 436c, 436d, 436e due to the free matrix in the deformation zone 474 remains the same, as described in the previous embodiments and for each layer of the mold assembly 430. Injection of the fluid 478 proceeds until the latter compression chamber 452e has been completely filled.

As seen in FIG. 28, each composite part 482e is then compressed between the separator 443 on one side and the membrane 336e pressurized by the controlling fluid 478 on the other side. This step therefore provides a generally similar degree of compression for all composite parts, which are at the same time more protected against the risk of defects due to warping, since each face of the strengthener generally sees a similar compression force.

For the cure and/or the solidification step, the base mold 432 is brought to the desired temperature as in the general case. Once initiated, the polymerization of the liquid matrix is generally accompanied by heat dissipation, which participates in upward heat flux diffusion, such that this exothermic polymerization reaction occurring in the base mold 432 initiates the cure of the composite part located in the frame assembly immediately above. The composite parts are therefore sequentially cured in the stack of frame assemblies 441a, 441b, 441c, 441d, 441e.

The energy used to heat any lower frame assembly is generally transferred from one layer to the next one rather than being used for cure only a single composite part. It should be noted that heating elements are optionally included in the vicinity of compression chambers 452a, 452b, 452c, 452d, 452e or in intermediate combinations of frame assemblies 441a, 441b, 441c, 441d, 441e to accelerate the cure process.

A mold assembly 530 and a process of manufacturing a composite part according to a sixth embodiment of the present invention are illustrated in FIGS. 29 to 33.

In this embodiment, the mold assembly 530 includes a base mold 532, a cover mold 534 and a plurality of frame assemblies 541a, 541b, 541c, 541d. The number of frame assemblies 541a, 541b, 541c, 541d varies depending on the number of parts to be manufactured simultaneously.

The mold assembly 530 is also provided with injection inlets 546 and evacuation outlets 544 in order to allow injection of the matrix over the strengtheners 566a, 566b, 566c, 566d as well as evacuation of air and excess matrix. In the illustrative embodiment, the evacuation outlet 544 and the injection inlet 546 are extending through the plurality of frame assemblies 541a, 541b, 541c, 541d that are stacked on the base mold 532 and covered by the cover mold 534.

When mounted one on top of the other as described hereinabove, the base mold 532, and the plurality of frame assemblies 541a, 541b, 541c, 541d define a stacking chamber 545 in which layers of strengtheners 566a, 566b, 566c, 566d, separators 543a, 543b, 543c and the cover mold 534 are to be alternatively placed one on top of the other.

The separators 543a, 543b, 543c participate in providing the shape during the manufacture of the composite parts and include on one side a machined compression wall 554 and on the other side, a machined contact wall 540. The compression wall 554 faces the contact wall 540 of the base mold 532 or the contact wall 540 of the separator located just below.

The separators 543a, 543b, 543c are made from sufficiently compressible material to allow themselves to generally deform upon injection of matrix into the strengtheners 566a, 566b, 566c, 566d, but sufficiently rigid at the same time to transmit the effect of the pressure of the matrix injected into one strengthener to neighboring strengtheners in the stacking chamber 545.

The cover mold 534 includes a compression wall 554 facing the contact wall 540 of the separator 543c located below and a punch 547 adapted to compress via the cover mold 534 the strengtheners 566a, 566b, 566c, 566d and the separators 543a, 543b, 543c contained between the base mold 532 and the cover mold 534. The shapes of the contact walls 540 and the compression walls 554 are so configured as to define the composite part to manufacture.

Using this mold assembly 530, several replicates of a same part may be obtained during one manufacturing process, without significantly diminishing the final composite part quality. This process may also be adapted to the mass production of structural parts, since the surface finish obtained by this approach on one side of the composite part is generally less critical and does not have to be of the same quality as for the parts manufactured by the other embodiments described hereinabove using a compression chamber, a strengthener chamber and a membrane.

In operation, the first strengthener 566a is slidably placed over the base mold 532 and laterally held in place by the first frame assembly 541a. The first separator 543a is then placed above the first strengthener 566a. This procedure is repeated the number of times necessary to obtain the desired number of composite parts, then the stack of strengtheners 566a, 566b, 566c, 566d and separators 543a, 543b 543c are covered with the cover mold 534.

Figure 30:
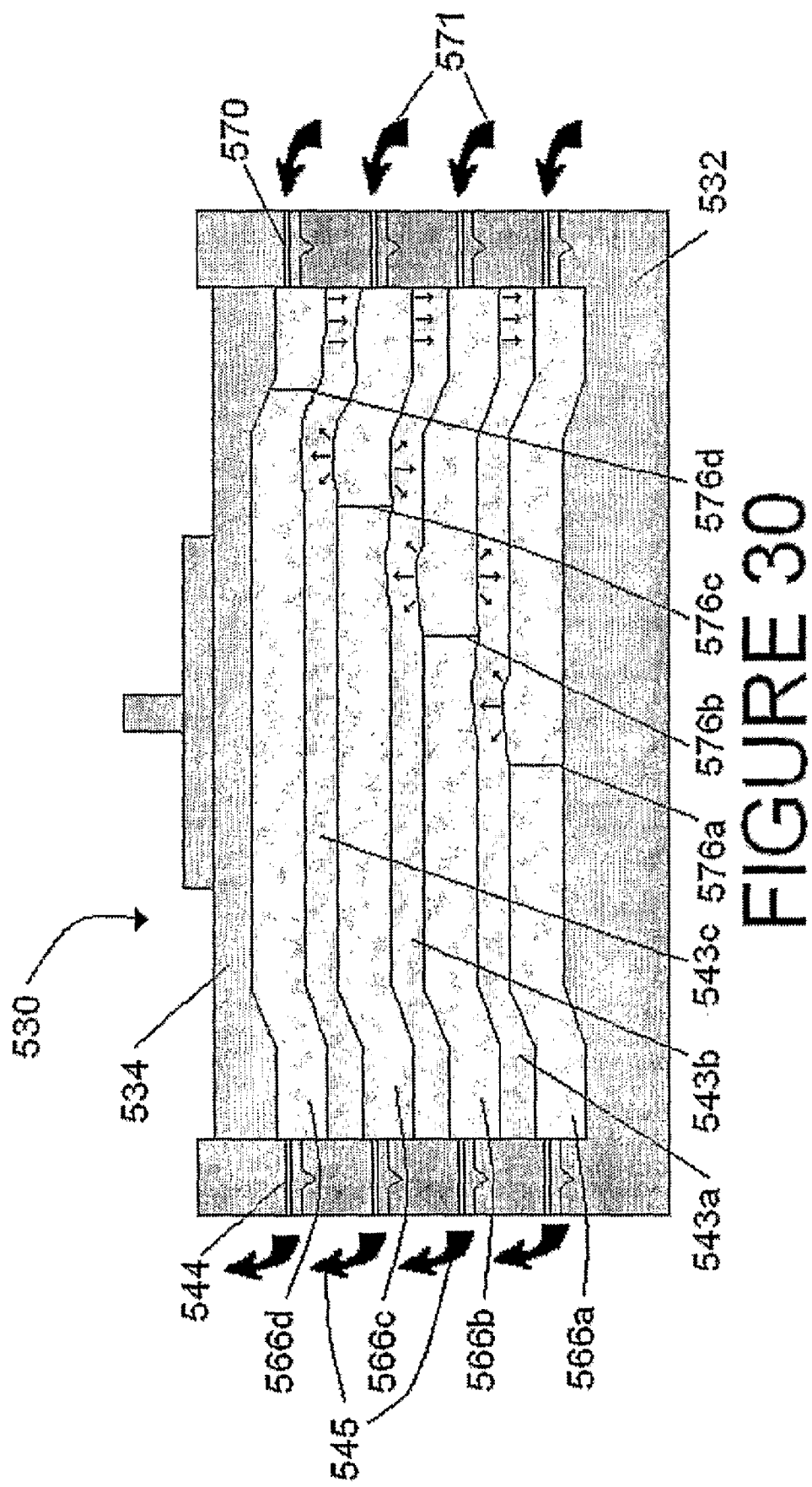
FIG. 30 is a side section view showing an impregnation step in the mold of FIG. 29.

As seen in the illustrative embodiment of FIG. 30, the method includes a successive injection of the matrix 570 into the strengtheners 566a, 566b, 566c, 566d via the injection inlets 546, with a slight delay between each injection.

The matrix 570 is injected (see arrows 571) under pressure into the first strengthener 566a, which brings about a deformation of the first separator 543a, as described hereinabove. Since no significant force opposes the movement of the first separator 543a, the latter presses the second strengthener 566b along the same direction.

The matrix flow front 576a progresses along the strengthener 566a. After the matrix flow front 576a reaching an optimized progression in the strengthener 566a, injection begins in the second strengthener 566b. The matrix 570 injected under pressure produces the same effect as described in the previous paragraph for the first injection, and generally deforms the separators located above 543b and beneath 543a the second strengthener 566b. The first strengthener 566a is thus generally compressed over the distance of propagation of the matrix flow front 576b into the second strengthener 566b. All the other injections of matrix in subsequent strengtheners are performed in a similar manner.

The last strengthener 566d has the particularity of not allowing the matrix under pressure injected therethrough to deform the rigid cover mold 534 located above the strengthener 566d. As a result, the matrix 570 compresses the layers of strengthener 566a, 566b, 566c located underneath.

The impregnation of the matrix in the strengtheners 566a, 566b, 566c, 566d and the progression of the matrix flow front 576a, 576b, 576c, 576d are thus regulated by the pressure applied by the contact wall 540 on the strengtheners 566a, 566b, 566c, 566d and generally corresponds to the pressure applied on the strengthener located above. During this impregnation step, the excess of fluid or gas in the vicinity of strengtheners 566a, 566b, 566c, 566d or the excess of matrix may be expelled via the evacuation outlet 544 (see arrows 545).

Figure 31:
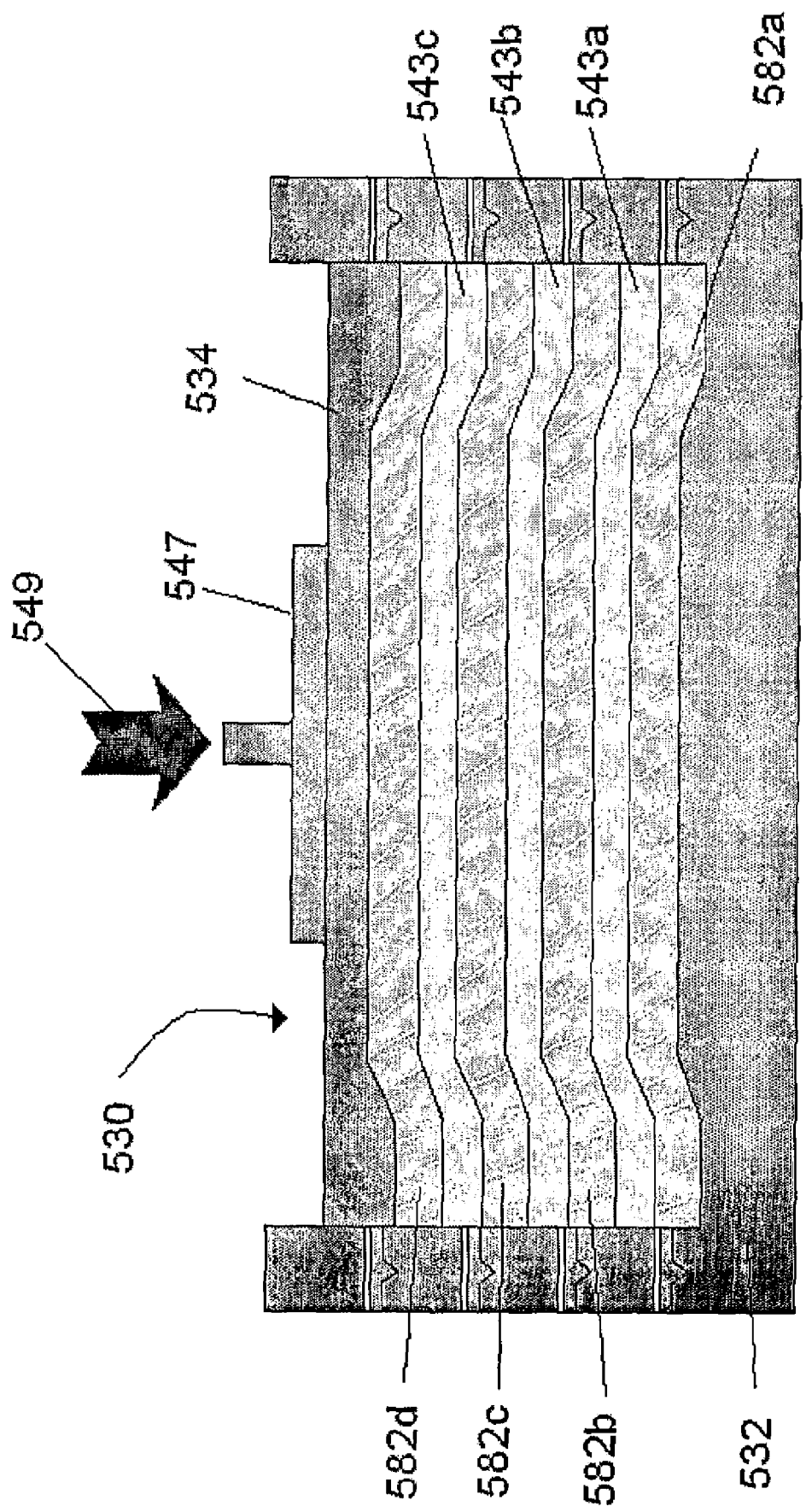
FIG. 31 is a side section view showing a compression step in the mold of FIG. 29.

The compaction step generally increases the fiber content of the composite parts manufactured and improves the reproducibility of the parts manufactured in a stack according to this embodiment. This step is usually performed by applying a compression force to the cover mold 534 via the punch 547 (see arrow 549), as illustrated in FIG. 31. The stiffness of the separators 543a, 543b, 543c is generally sufficient to cause compaction of the impregnated strengtheners 582a, 582b, 582c, 582d, in compliance with the geometry of the separators 543a, 543b, 543c. For this reason, the crushing of the separators 543a, 543b, 543c remains generally minimal.

In this embodiment, the consolidation of the composite parts 582a, 582b, 582c, 582d generally occurs in one direction, which is not necessarily a direction normal to the surfaces of the composite parts 582a, 582b, 582c, 582d. In the previous embodiments, the compaction of the parts is usually performed by the controlling fluid proving a compression loading normal to the surface of the composite part.

Figure 33:
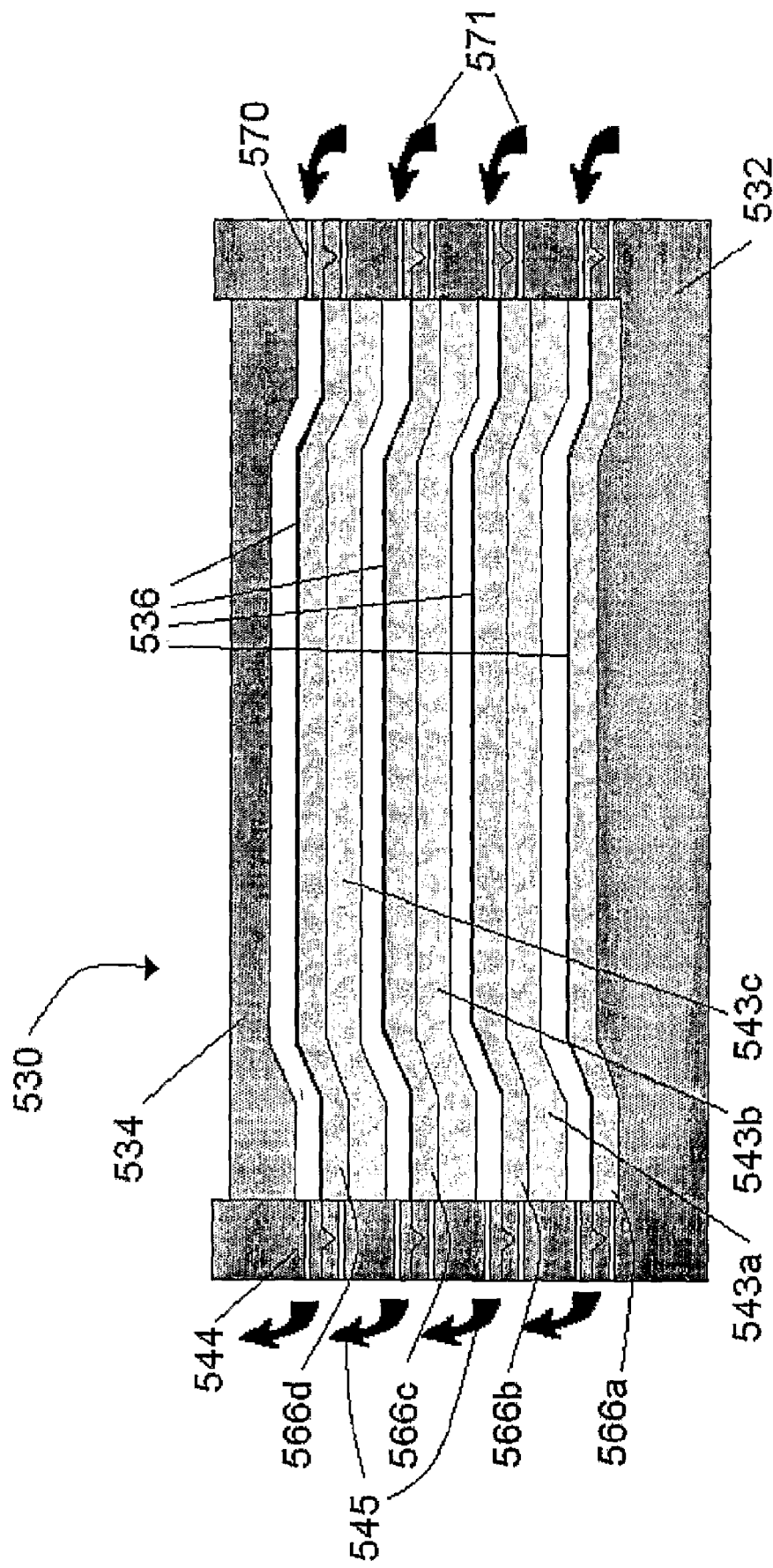
FIG. 33 is a side section view showing a membrane in the mold of FIG. 29.

However, a controlling fluid 578 may be optionally injected between the cover mold 534 provided or not with a membrane covering the last strengthener 582d. Alternatively, as illustrated in FIG. 33, each strengthener 566a, 566b, 566c, 566d is covered with a membrane 536 so configured as to interact with a controlling fluid injected simultaneously between each separator 543a, 543b, 543c. In these cases, the controlling fluid can be injected either into a porous separator 543a, 543b, 543c, or as illustrated in FIG. 33, directly between the separators 543a, 543b, 543c and an added membrane covering the strengtheners 582a, 582b, 582c, 582d.

Also alternatively, the membrane 536 is inserted between the separators 543a, 543b, 543c and the strengtheners 582a, 582b, 582c, 582d, such that the controlling fluid can still be injected either into the porous separators 543a, 543b, 543c, or directly between the separators 543a, 543b, 543c and the strengtheners 582a, 582b, 582c, 582d.

Figure 32:
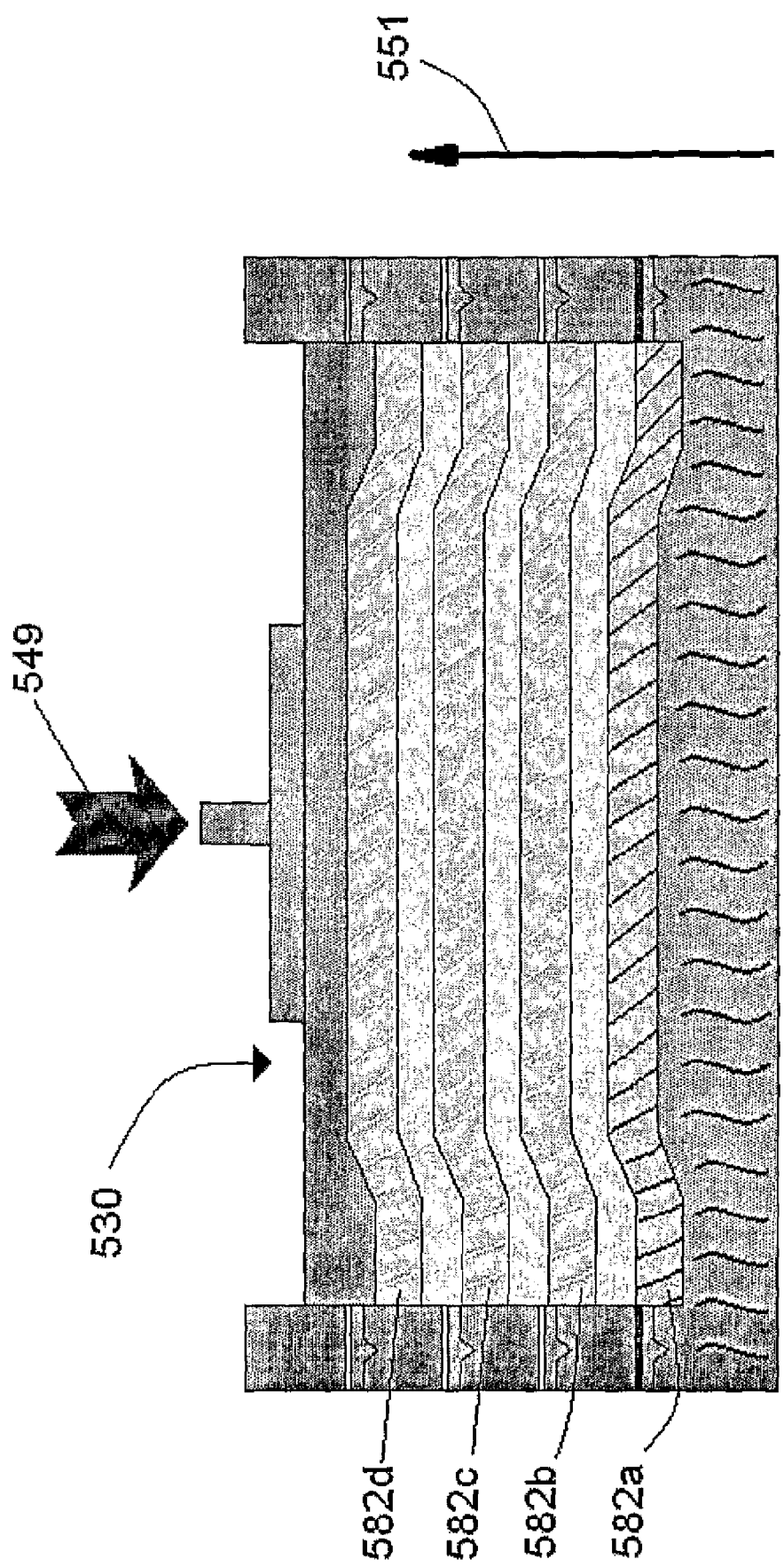
FIG. 32 is a side section view showing a cure step in the mold of FIG. 29.

The cure step generally corresponds to the cure step described in the fourth embodiment of the present invention. As shown in FIG. 32 of the illustrative embodiment, the compression force is maintained on the mold assembly 530 during the cure and/or the solidification step which more particularly involves cure and/or solidification of the first composite part 582a followed by the subsequent cure and/or solidification of the remaining composite parts 582b, 582c, 582d (see arrow 551). Once cure is completed, a finishing step is sometimes required to meet final composite part specifications.

Figure 34:
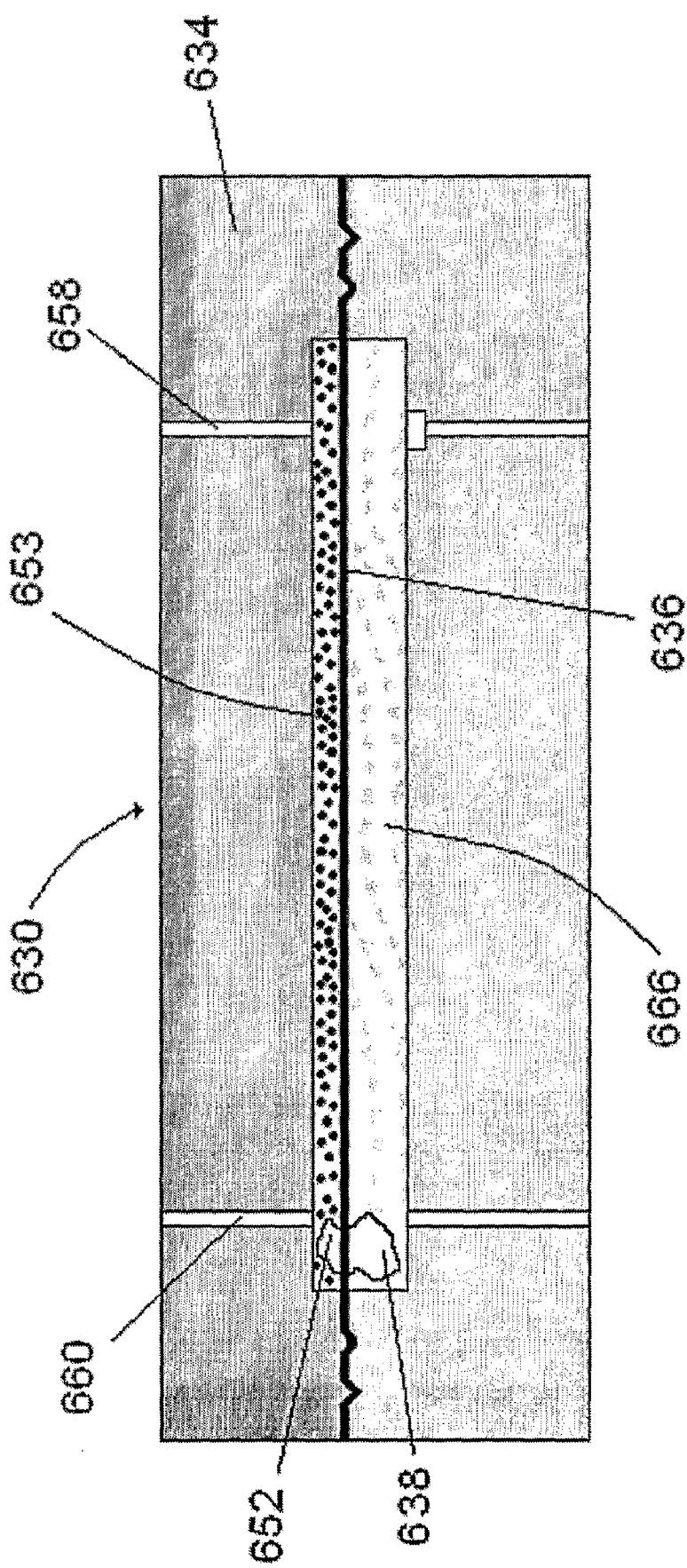
FIG. 34 a mold according to a seventh embodiment of the present invention.

A mold assembly 630 and a process of manufacturing a composite part according to a seventh embodiment of the present invention are illustrated in FIG. 34.

In this embodiment, the mold assembly 630 includes a porous medium 653 provided in the compression chamber 652 of the cover mold 634 which generally controls or reduces the speed at which the fluid injected from the fluid control aperture 658 to the vent 660 progresses in the compression chamber 652. Alternatively, the porous medium is replaced by a granular medium such as for example sand or by a fibrous medium.

The porous medium 653 is a generally deformable element 131 which in operation, allows the passage of the fluid through itself, but its porous composition significantly helps to control or restrain the propagation of the flow of control fluid. In some instances, depending on the physical properties of the strengthener, of the chemical properties of the matrix, of the nature of the control fluid and on the pressure and temperature conditions while the mold assembly 630 is in operation, the flow propagation of control fluid may need to be controlled with respect to the flow propagation of the matrix in the strengthener.

For instance, a control fluid flowing in the compression chamber 652 from the fluid control aperture 658 to the vent 660 generally provides an efficient and non-uniform compression of the membrane 636 in the region swollen by the free matrix so as to facilitate the flow of the free matrix toward the strengthener. By having a porous medium 653 in the compression chamber 652, the propagation of the control fluid in the compression chamber 652 may be delayed such that the control fluid flow front (not shown) does not go beyond the matrix flow front, in order to efficiently help impregnate the strengthener with the matrix.

Although the present invention has been described hereinabove by way of embodiments thereof, it can be modified, without departing from the spirit and nature of the subject invention as defined in the appended claims.

The invention claimed is:

1. A method for generating a composite part from a strengthener and a matrix comprising:
   a) sealingly positioning a deformable member in between a first chamber of a first mold portion and a second chamber of a second mold portion; said first chamber receiving the strengthener;
   b) impregnating the strengthener with the matrix injected in said first chamber;
   c) propagating the matrix in and along the strengthener by pressurizing a controlling fluid injected in said second chamber on said deformable member.

2. A method as recited in claim 1, wherein said impregnating the strengthener is performed at a vacuum pressure which is lower than atmospheric pressure.

3. A method as recited in claim 1, wherein said propagating the matrix in and along the strengthener is performed while heating said controlling fluid.

4. A method as recited in claim 1, wherein said propagating the matrix in and along the strengthener is performed at a compaction pressure greater than atmospheric pressure.

5. A method as recited in claim 1, further including vibrating the impregnated strengthener to expel a significant portion of residual gases entrapped in the strengthener.

6. A method as recited in claim 1, further including a solidification of the composite part at a compaction pressure greater than atmospheric pressure.

7. A method as recited in claim 1, further including a cure of the strengthener with heat transfer applied to said mold and the solidification of the composite part at a compaction pressure greater than atmospheric pressure.

8. A method as recited in claim 7, wherein said cure of the strengthener uses ultra-violet light.

9. A method as recited in claim 6, wherein said solidification of the composite part is performed while decreasing the temperature of the strengthener.

10. A method as recited in claim 1, further including a positioning of a deformable element in a second chamber of a second mold portion adjacent to said deformable member.

11. A method as recited in claim 1, further including a positioning of a tube in a second chamber of a second mold portion adjacent to said deformable member.

12. A method as recited in claim 11, wherein said propagating the matrix in and along the strengthener by pressurizing a controlling fluid is performed while pressurizing said tube whereby said tube deforms and compresses said member by compressing said controlling fluid.

13. A method as recited in claim 11, wherein said propagating the matrix in and along the strengthener by pressurizing a controlling fluid is performed while pressurizing said tube whereby said tube deforms and compresses said member.

14. A method as recited in claim 1, wherein said propagating the matrix in and along the strengthener by pressurizing a controlling fluid is performed while varying the position of compartmentalized portions of said second mold portion with respect to said member.

15. A method as recited in claim 1, further including a deformation of said member mating with passages in said second mold portion provided adjacent to said member.

16. A method as recited in claim 1, further including a positioning of a porous medium in a second chamber of a second mold portion adjacent to said deformable member.

17. A method for generating a pre-determined number of composite parts from strengtheners and matrix comprising:
   a) sealingly positioning a deformable member in between a strengthener chamber of a first mold portion and a compression chamber of a second mold portion; said strengthener chamber including the strengthener;
   b) repeating said sealingly positioning a deformable member by stacking a number of subsequent mold portions one next to the other determined by a predetermined number of parts to manufacture;
   c) impregnating the strengtheners with matrix injected in said strengthener chambers;
   d) compacting the matrix toward the strengthener by pressurizing a controlling fluid injected in said compression chamber on said deformable member.

18. A method as recited in claim 17, wherein said impregnating the strengtheners with matrix injected in said strengthener chambers is performed with a delay between each sequential injection of matrix in consecutive strengtheners.

19. A method as recited in claim 17, further including a cure of the strengtheners performed by heating said first mold portion; whereby said second mold portions and said subsequent mold portions are sequentially heated by heat transfer from a previously heated mold portion.

20. A method for generating a predetermined number of composite parts from strengtheners and matrix comprising:
   a) positioning an alternating stack of strengtheners and deformable members in a stacking chamber generated by sealingly mounting frame assemblies on a base mold assembly;
   b) impregnating the strengtheners with matrix injected in said stacking chamber;
   c) compacting the matrix toward and along the strengtheners by pressurizing on said stack of strengtheners and deformable members;
   wherein said positioning an alternating stack of strengtheners and deformable members further provides for a membrane provided in between the strengtheners and the deformable members;
   wherein said compacting the matrix toward and along the strengthener is performed while pressurizing a controlling fluid injected in said stacking chamber on said membrane.

21. A method as recited in claim 20, wherein said impregnating the strengtheners with matrix is performed while successively injecting the matrix into consecutive strengtheners with a slight delay between each injection.

22. A method as recited in claim 21, wherein said compacting the matrix is performed while said successively injecting the matrix, said successively injecting the matrix including at least a first injection in a first strengthener and a second injection in a second strengthener with a delay from said first injection; said second injection compressing said first strengthener by pressurizing said deformable member provided in between said first and second strengthener.

23. A method as recited in claim 1, wherein said propagating the matrix in and along the strengthener by pressurizing a controlling fluid injected in said second chamber on said deformable member is delayed after said injecting the impregnating the strengthener with the matrix injected in said first chamber is performed.

* * * * *